(12) United States Patent
Wang et al.

(10) Patent No.: US 8,441,710 B2
(45) Date of Patent: May 14, 2013

(54) TUNABLE THIN-FILM FILTER

(75) Inventors: Ligang Wang, Penfield, NY (US);
Turan Erdogan, Spencerport, NY (US)

(73) Assignee: Semrock, Inc., Rochester, NY (US)

( * ) Notice: Subject to any disclaimer, the term of this patent is extended or adjusted under 35 U.S.C. 154(b) by 404 days.

(21) Appl. No.: 12/684,871

(22) Filed: Jan. 8, 2010

(65) Prior Publication Data

US 2011/0170164 A1    Jul. 14, 2011

(51) Int. Cl.
*G02B 26/00*  (2006.01)
*G02B 26/08*  (2006.01)
*G01J 5/02*   (2006.01)
*G01N 21/25*  (2006.01)

(52) U.S. Cl.
USPC ......... 359/290; 359/196.1; 250/347; 356/418

(58) Field of Classification Search ............... 359/196.1,
359/197.1, 198.1, 199.1, 199.2, 199.3, 199.4,
359/200.6, 200.7, 200.8, 201.1, 201.2, 202.1,
359/203.1, 204.1–204.5, 209.1, 212.1, 212.2,
359/213.1, 214.1, 222.1, 223.1, 225.1, 226.1,
359/226.2, 238, 298–304, 321, 546, 618,
359/629, 631–634, 839, 871–874, 883, 290–291,
359/889–891, 773, 725; 250/226, 334, 347,
250/353; 356/418–419
See application file for complete search history.

(56) References Cited

U.S. PATENT DOCUMENTS

| | | | |
|---|---|---|---|
| 2,406,318 A | 8/1946 | Brace | |
| 2,670,400 A | 2/1954 | Grunwald | |
| 3,306,158 A | 2/1967 | Makabe et al. | |
| 3,390,604 A | 7/1968 | Makabe | |
| 3,492,478 A | 1/1970 | Smith | |
| 3,666,351 A * | 5/1972 | Pao | ............................... 359/298 |

(Continued)

FOREIGN PATENT DOCUMENTS

| | | |
|---|---|---|
| DE | 20 2008 016 287 U1 | 4/2009 |
| EP | 1 130 432 A2 | 9/2001 |

(Continued)

OTHER PUBLICATIONS

German Cancer Research Center Office of Technology Transfer, *Technology Offer* "Device for tuning of color beam splitters (P-832)," Apr. 2009 (2 pages).

(Continued)

*Primary Examiner* — Dawayne A Pinkney
(74) *Attorney, Agent, or Firm* — Finnegan, Henderson, Farabow, Garrett & Dunner LLP

(57) ABSTRACT

An optical filter is provided, including a first plurality and second plurality of alternating first and second material layers, where the first plurality of layers is at a first angle to incident light and has a cut-on edge, and the second plurality of layers is at a second angle to the incident light and a cut-off edge; where polarization splitting of the first plurality of layers at the cut-on edge and polarization splitting of the second plurality of layers at the cut-off edge do not exceed approximately 1 percent for any first and second angle between approximately 0 and 40 degrees; and the s-stopband wavelength of the second plurality of layers is approximately less than or equal to the cut-on edge wavelength, which is less than the cut-off edge wavelength, which is approximately less than or equal to the s-stopband wavelength of the first plurality of layers.

55 Claims, 19 Drawing Sheets

U.S. PATENT DOCUMENTS

| | | | |
|---|---|---|---|
| 3,759,604 | A | 9/1973 | Thelen |
| 3,861,788 | A | 1/1975 | Webster |
| 3,864,037 | A | 2/1975 | Johnson |
| 4,009,453 | A | 2/1977 | Mahlein |
| 4,082,464 | A | 4/1978 | Johnson, Jr. |
| 4,084,909 | A | 4/1978 | Mathisen |
| 4,141,653 | A | 2/1979 | Arnold |
| 4,176,916 | A | 12/1979 | Carpenter |
| 4,373,782 | A | 2/1983 | Thelen |
| 4,410,272 | A | 10/1983 | Beauvineau et al. |
| 4,461,532 | A | 7/1984 | Sato et al. |
| 4,684,255 | A | 8/1987 | Ford |
| 4,733,926 | A | 3/1988 | Title |
| 4,738,535 | A | 4/1988 | Webster |
| 4,772,798 | A | 9/1988 | Craig |
| 4,775,234 | A | 10/1988 | Shimomura |
| 5,034,613 | A | 7/1991 | Denk et al. |
| 5,132,826 | A | 7/1992 | Johnson et al. |
| 5,149,578 | A | 9/1992 | Wheatley et al. |
| 5,221,957 | A | 6/1993 | Jannson et al. |
| 5,400,174 | A | 3/1995 | Pagis et al. |
| 5,449,413 | A | 9/1995 | Beauchamp et al. |
| 5,481,402 | A | 1/1996 | Cheng et al. |
| 5,591,981 | A | 1/1997 | Heffelfinger et al. |
| 5,767,965 | A | 6/1998 | Zhou et al. |
| 5,781,332 | A | 7/1998 | Ogata |
| 5,781,341 | A | 7/1998 | Lee |
| 5,796,512 | A | 8/1998 | Wachman et al. |
| 5,852,498 | A | 12/1998 | Youvan et al. |
| 5,926,317 | A | 7/1999 | Cushing |
| 5,953,169 | A | 9/1999 | Tsai |
| 6,075,599 | A | 6/2000 | Milman et al. |
| 6,110,337 | A | 8/2000 | Sullivan et al. |
| 6,115,180 | A | 9/2000 | Hirai et al. |
| 6,217,720 | B1 | 4/2001 | Sullivan et al. |
| 6,292,299 | B1 | 9/2001 | Liou |
| 6,344,653 | B1 | 2/2002 | Webb et al. |
| 6,362,904 | B1 | 3/2002 | Cormack |
| 6,611,378 | B1 | 8/2003 | Wang et al. |
| 6,700,690 | B1 | 3/2004 | Buchsbaum et al. |
| 6,781,757 | B2 | 8/2004 | Cormack |
| 6,809,859 | B2 | 10/2004 | Erdogan et al. |
| 6,879,619 | B1 * | 4/2005 | Green et al. .................... 372/98 |
| 6,894,838 | B2 | 5/2005 | Mizrahi et al. |
| 6,943,938 | B1 | 9/2005 | Liu et al. |
| 7,050,224 | B2 | 5/2006 | Kawamata et al. |
| 7,068,430 | B1 | 6/2006 | Clarke et al. |
| 7,119,960 | B1 | 10/2006 | Erdogan et al. |
| 7,123,416 | B1 | 10/2006 | Erdogan et al. |
| 7,411,679 | B2 | 8/2008 | Erdogan et al. |
| 7,420,678 | B2 | 9/2008 | Lundgren et al. |
| 7,453,568 | B2 | 11/2008 | Kawamata et al. |
| 8,059,327 | B1 | 11/2011 | Erdogan et al. |
| 2002/0054614 | A1 | 5/2002 | Jin |
| 2004/0240093 | A1 * | 12/2004 | Yoshikawa et al. ........... 359/883 |
| 2005/0171630 | A1 | 8/2005 | Dinauer et al. |
| 2006/0007547 | A1 | 1/2006 | Kamikawa |
| 2006/0158991 | A1 | 7/2006 | Hatano et al. |
| 2006/0228089 | A1 | 10/2006 | Shimokozono et al. |
| 2007/0268568 | A1 | 11/2007 | Higashi et al. |
| 2008/0037129 | A1 | 2/2008 | Hodgson et al. |
| 2008/0055584 | A1 | 3/2008 | Pradhan et al. |
| 2008/0055716 | A1 | 3/2008 | Erdogan et al. |
| 2008/0055717 | A1 | 3/2008 | Pradhan et al. |

FOREIGN PATENT DOCUMENTS

| | | |
|---|---|---|
| WO | WO 2004061490 A1 | 7/2004 |
| WO | WO 2004/111717 A1 | 12/2004 |
| WO | WO 2006/080422 A1 | 8/2006 |

OTHER PUBLICATIONS

International Search Report and Written Opinion mailed Mar. 10, 2011 for PCT/US2011/020438 (10 pages).

B.E. Perilloux, *Thin-Film design*, pp. i-xvi, 1-116 (SPIE Press, Bellingham Washington) (2002) (68 pages total).

A. Thelen, "Nonpolarizing edge filters," J. Opt. Soc. Am., vol. 71, pp. 309-314 (Mar. 1981)(6 pages).

A. Thelen, "Nonpolarizing edge filters: Part 2," Appl. Optics, vol. 23, pp. 3541-3543 (Oct. 15, 1984) (3 pages).

P. Yeh, *Optical Waves in Layered Media* John Wiley & Sons, New York, 1988, pp. v-x, 144-165, and 254-297 (38 pages).

A. Thelen, *Design of Optical Interference Coatings*, McGraw-Hill, New York, 1989, pp. v-viii, 177-196, and 250 (16 pages).

R.-Y. Tsai, et al., "Comparative Study of Ultraviolet-Infrared Cutoff Filters Prepared by Reactive Electron-Beam Deposition and Reactive Ion-Assisted Deposition", Opt. Eng., May 1998, pp. 1475-1481 (7 pages).

T.R. Jensen, et al., "Environmentally Stable UV Raman Edge Filters", Society of Vacuum Coaters 43rd Annual Technical Conference Proceedings (2000) pp. 1-5 (5 pages).

H.A. Macleod, Thin-Film Optical Filters, Third Edition, Taylor & Francis, NY, 2001, pp. vii-xi, 20-37, 46-50, 210-392 (213 pages total).

M. Lequime, "Tunable thin-film filters: review and perspectives," Proc. SPIE vol. 5250, (*Advances in Optical Thin Films*, Ed. by C. Amra, N. Kaiser, H.A. McLeod) pp. 302-311 (2004) (10 pages).

P.W. Baumeister, *Optical Coating Technology*, SPIE Press, Bellingham WA, 2004, pp. v-xviii, "5-41"-"5-43", "7-76"-"7-77". "8-11"-"8-17", and "10-9"-"10-13" (33 pages).

L. Wang, "Constrain of Coating Thickness on LaserMux," Semrock Memorandum (Jan. 9, 2007) and Attachment #1: Newport Tutorials entitled "Gaussian Beam Optics Tutorial" (Dec. 17, 2008) (6 pages total).

* cited by examiner

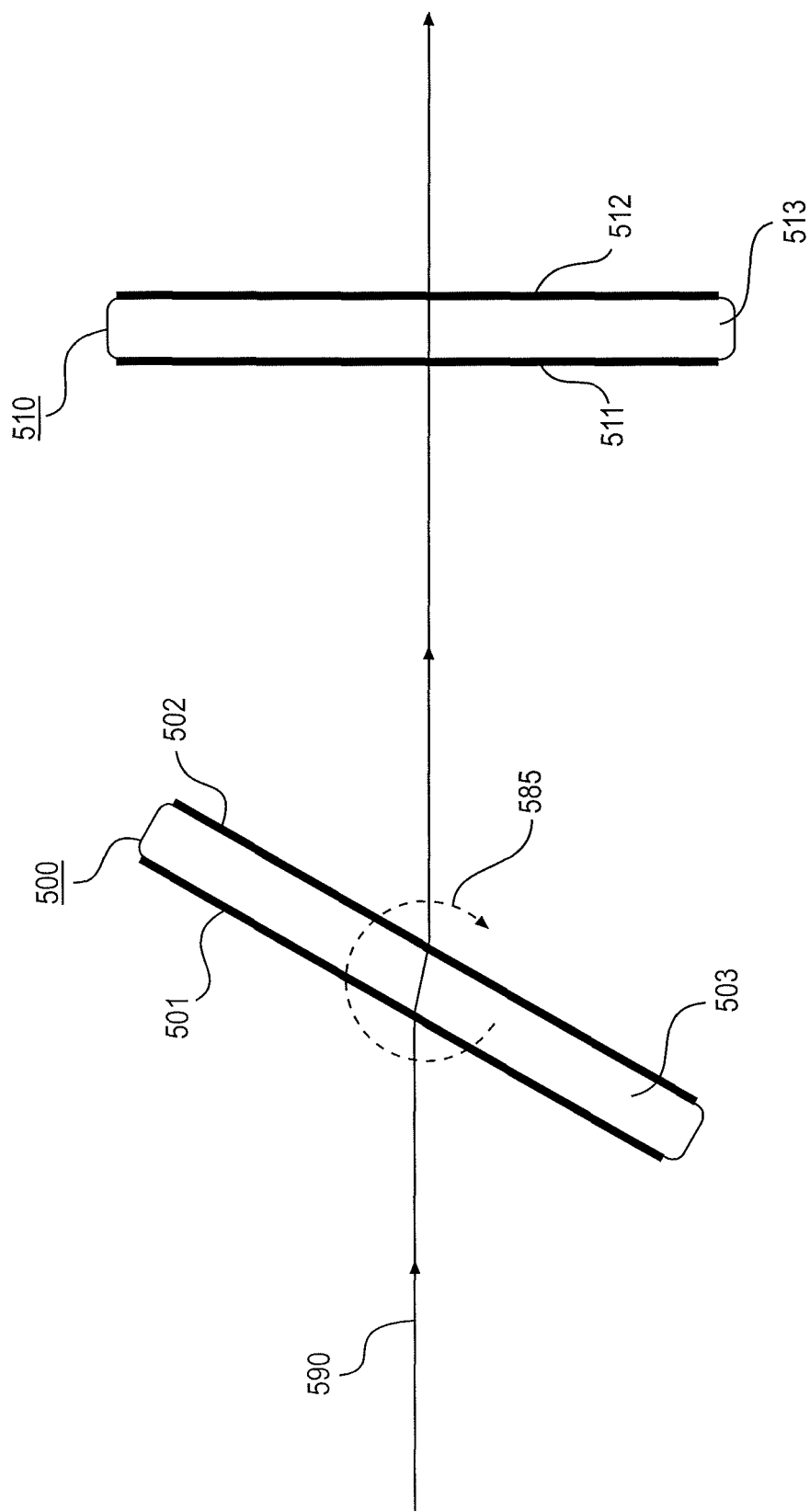

TUNABLE THIN-FILM FILTER

FIELD

This disclosure relates to materials, components, and methods directed to tunable optical filters, including systems that use such tunable optical filters, and methods of making such filters.

BACKGROUND

Often it is useful in an optical system to isolate a single wavelength (or limited range of wavelengths) or to measure the wavelength properties of light impinging on or transmitted through the system. Thin-film interference filters, such as optical edge filters, notch filters, and/or laser line filters (LLF's), can be advantageously used in such systems to isolate a single wavelength or a limited range of wavelengths, or block unwanted light. Many uses for thin-film interference filters are known. For example, U.S. Pat. No. 7,068,430, which is incorporated herein by reference, discusses the use of such filters in fluorescence spectroscopy and other quantification techniques.

In general, thin-film interference filters are wavelength-selective as a result of the interference effects that take place between incident and reflected waves at boundaries between materials having different refractive indices. Interference filters conventionally include a dielectric stack composed of multiple alternating layers of two or more dielectric materials having different refractive indices. Moreover, in a conventional thin-film interference filter, each of the respective layers of the filter stack is very thin, e.g., having an optical thickness (physical thickness times the refractive index of the layer) on the order of a quarter wavelength of light. These layers may be deposited on one or more substrates (e.g., a glass substrate) and in various configurations to provide one or more band-pass, or band-rejection filter characteristics. Further still, in the case of a filter which substantially reflects at least one band of wavelengths and substantially transmits at least a second band of wavelengths immediately adjacent to the first band, such that the filter enables separation of the two bands of wavelengths by redirecting the reflected band, the resulting filter is conventionally called a "dichroic beamsplitter," or simply a "dichroic" filter.

As used herein, the "blocking" of a filter at a wavelength, or over a range of wavelengths, is typically measured in optical density ("OD" where $OD=-\log_{10}(T)$, T being transmission of the filter at a particular wavelength). Conventional filters that achieve high OD values at certain wavelengths or over a range of wavelengths may not necessarily also achieve high transmission (in excess of 50%, for example) at any other wavelengths, or over other ranges of wavelengths. High OD is generally exhibited in a fundamental "stopband" wavelength region, and, as discussed further below, such stopbands have associated with them higher-order harmonic stopband regions occurring at other wavelength regions.

Edge filters, as used herein, are configured so as to exhibit a transmitted spectrum having a defined edge, where unwanted light having wavelengths above or, alternatively, below a chosen "transition" wavelength $\lambda_T$ is blocked, and where desired light is transmitted on the opposite side of $\lambda_T$. In addition, as used herein, edge filters are configured such that the wavelength range over which the transmission characteristics transition from "blocking" to "transmitting" or vice versa is substantially smaller (i.e., at least one order of magnitude smaller, and usually two orders of magnitude smaller or more) than the wavelength ranges over which the "blocking" and "transmitting" characteristics are exhibited. Edge filters which transmit optical wavelengths longer than $\lambda_T$ are called long-wave pass (LWP) filters, and those that transmit wavelengths shorter than $\lambda_T$ are short-wave pass (SWP) filters.

U.S. patent application Ser. No. 12/129,534, the contents of which are incorporated by reference, includes a discussion of the spectral transmission characteristics of idealized LWP and SWP filters, respectively. For example, an idealized LWP filter completely blocks light with wavelengths below $\lambda_T$, and completely transmits wavelengths above $\lambda_T$. Conversely, an idealized SWP filter completely transmits light with wavelengths below $\lambda_T$, and completely blocks light with wavelengths above $\lambda_T$.

Edge steepness and the relative amount of transmitted light can be important parameters in many filter applications. As discussed above, an idealized edge filter may be considered to have a precise wavelength edge that is represented by a vertical line in a plot of transmission versus wavelength at wavelength $\lambda_T$. As such, an idealized filter has an "edge steepness" (i.e. the change in wavelength over which the transmission characteristics transition from a "blocking" to "transmitting" or vice versa) of 0 at $\lambda_T$. However, real edge filters change from blocking to transmitting over a small but non-zero range of wavelengths, with increasing values of edge steepness reflecting an edge that has increasingly less slope. The transition of a real edge filter is therefore more accurately represented by a non-vertical but highly sloped line at or near $\lambda_T$. Similarly, while an ideal edge filter may be considered to transmit all of the incident light in the transmission region (transmission T=1), real edge filters have some amount of transmission loss, invariably blocking a small portion of the light in the intended transmission region (T<1). As a result, the edge steepness of a real edge filter can be considered to be dependent upon the transmission range over which it is defined.

Systems that benefit from wavelength selection through optical filtering can be expected to benefit from an optical filter that exhibits high transmission in the filter passband regions, highly sloped spectral edges, and high out-of-band blocking of undesired wavelengths. Consequently, thin-film optical filters, which are capable of providing close to 100% transmission, exhibit highly sloped spectral edges (transitioning from high transmission to blocking of optical density 6 or higher in less than 1% of the edge wavelength), and exhibit blocking of optical density 6 or higher over wide spectral regions, can be considered beneficial to such systems.

However, thin-film filters are also conventionally regarded as "fixed" filters, in that each thin-film filter has a certain spectral function that is conventionally usable over a limited wavelength region. To the extent a conventional system utilizing a first thin-film filter with a given spectral function may require a different spectral function, such a system would require a means for swapping the first thin-film filter with a different one exhibiting the required spectral function. Mechanical means to perform filter swapping are known, such as the use of filter wheels, but these are conventionally large, relatively slow (i.e., minimum switching times are conventionally 50 to 100 ms), and permit only a limited number of filters (e.g., conventional wheels contain from 4 to 12 slots for such fixed filters). Thus, conventional filter systems that can benefit from the use of thin-film filters and also benefit from the availability of variable, or dynamic, spectral characteristics will have limited application as a result of the size, speed, and filtering function flexibility characteristics discussed above.

Conventionally, when it is desired to change a spectral function associated with a wavelength, or wavelength range, to a different wavelength or wavelength range at a relatively high speed, diffraction gratings have been used. Diffraction gratings permit any wavelength within a range to be selected, and can accommodate a change of wavelength relatively quickly since only rotation of the grating is required. Thus, gratings are the basis of most scanning spectral measurement systems. However, gratings do not offer very good spectral discrimination. For example, spectral edges are conventionally not highly sloped and out-of-band blocking is conventionally poor. Moreover, concatenating multiple diffraction grating spectrometers together in order to address some of these deficiencies tends not to completely alleviate the poor out-of-band blocking, reduces the overall transmission, and further makes the instrument very large. Grating-based systems also conventionally exhibit limited control over the filter bandwidth. That is, while the bandwidth may be adjusted (usually by adjusting the width of a mechanical slit), the slope of the edge will decrease as the bandwidth increases. Further still, at least one spatial dimension is conventionally required for spreading out light rays in a wavelength-dependent manner for grating-based systems, and thus it is not possible to measure a two-dimensional imaging beam directly (at one instant of time) with a conventional diffraction grating. For example, so-called "imaging grating spectrometers" provide one-dimensional spatial imaging with the second dimension reserved for spectral information. To the extent a second spatial dimension is present in the imaging beam, and to the extent it is static, it may be captured separately as a function of the time it takes the diffraction grating to sample the second available dimension.

Other conventional filter systems that are designed to exhibit variable spectral functionality include angle-tuned thin-film filters, liquid crystal tunable filters, acousto-optic tunable filters and linear-variable tunable filters. Each is discussed below.

With regard to angle-tuned thin-film filters, it is known that the spectrum of a thin-film filter shifts toward shorter wavelengths when the angle of incidence (AOI) of light upon the filter is increased from 0 degrees (normal incidence) to larger angles (see *Optical Waves in Layered Media*, Pochi Yeh, Wiley, New York, 1988, Section 7.6). This shift is generally described by the equation $$\lambda(\theta) = \lambda(0) \sqrt{1 - \frac{\sin^2(\theta)}{n_{\it eff}^2}} \quad (1)$$

where θ is the AOI and $n_{\it eff}$ is the "effective index of refraction," which is generally dependent upon the filter design and the two orthogonal states of polarization (i.e., "s" and "p"). This effect may be used to tune the spectrum of an optical filter over a limited range of wavelengths. Conventionally, however, the filter spectrum becomes distorted at larger angles, and the wavelength shift can be significantly different for s- and p-polarized light, leading to a strong polarization dependence at higher angles.

As an example, FIG. 1 depicts calculated spectra of an exemplary multi-cavity Fabry-Perot thin-film filter configured to provide a narrow passband (about 2 nm) at 561 nm. Curves 101 and 102 are calculated p- and s-polarized transmission spectra associated with an AOI of 60 degrees, curves 111 and 112 are calculated p- and s-polarized transmission spectra associated with an AOI of 45 degrees, curves 121 and 122 are calculated p- and s-polarized transmission spectra associated with an AOI of 30 degrees, and curves 130 are calculated p- and s-polarized transmission spectra associated with an AOI of 0 degrees. As exhibited in FIG. 1, the passband becomes narrower for s-polarization and wider for p-polarization as the AOI increases from 0 to 60 degrees. In addition, the peak in the transmission curve exhibits more of a wavelength shift as a function of AOI for p- than for s-polarized transmitted light. As a result, at higher AOI values, a conventional thin-film filter exhibits strong polarization dependence. By way of example only, the conventionally usable range of wavelengths over which this exemplary filter may be tuned away from 0 degrees AOI at 561 nm (that is, before excessive distortion of the spectrum occurs) is approximately 10 to 15 nm of wavelength, or about 2 to 3% of the starting wavelength.

Conventional angle-tuned thin-film filters consistent with the exemplary thin-film filter of FIG. 1 are used in a number of commercial devices and instruments for fiber-optic telecommunications test and measurement and system applications which are configured to operate near 1550 nm. Conventional tuning ranges for these exemplary devices are about 30 to 40 nm near 1550 nm, which corresponds to about 2 to 2.5% of the starting wavelength. U.S. Pat. Nos. 5,481,402, 5,781,332, and 5,781,341 also disclose angle-tunable thin-film filters for fiber-optic/telecom applications, including the use of a multi-cavity Fabry-Perot thin-film bandpass filter with a passband near 1550 nm positioned in the vicinity of collimated light coupled to an optical fiber, and rotated to achieve angle tuning properties.

For applications that do not rely upon precise laser lines or fiber-optic telecommunications, wider passbands are typically desired. By way of example only, FIG. 2 depicts calculated spectra associated with an exemplary multi-cavity Fabry-Perot thin-film filter configured to exhibit a passband of approximately 20 nm at full-width-half-maximum (FWHM). Curves 201 and 202 are calculated p- and s-polarized transmission spectra associated with an AOI of 60 degrees, curves 211 and 212 are calculated p- and s-polarized transmission spectra associated with an AOI of 45 degrees, curves 221 and 222 are calculated p- and s-polarized transmission spectra associated with an AOI of 30 degrees, and curves 230 are calculated p- and s-polarized transmission spectra associated with an AOI of 0 degrees. The behavior exhibited by the exemplary thin-film filter of FIG. 2 is analogous to that of the filter of FIG. 1. For example, the passband wavelengths shift to shorter wavelengths at higher AOI. Moreover, the transmission characteristics over the passband region become increasingly distorted (i.e., exhibit a larger range of variability) at higher AOI. Further, the passband region (as defined by the stopband edges) becomes narrower for s-polarization and wider for p-polarization as the AOI increases. Further still, the passband exhibits more of a wavelength shift as a function of AOI for p- than for s-polarized light. All of these characteristics conventionally result in an increasingly distorted spectrum at higher AOI, thus reducing the useful tuning range of such a conventional filter.

Many fluorescence imaging and quantization applications can benefit from filters with passbands that are wider than even the exemplary thin-film filter of FIG. 2. For example, such applications can benefit from passbands that are 30 to 50 nm wide or more (at visible wavelengths). For filters with such wide passbands, and especially for applications involving incoherent light, a conventional filter may be formed from a combination of long-wave pass and short-wave pass edge filters (such as those disclosed in U.S. Pat. Nos. 6,809,859 and 7,411,679 B2). Such edge filters are formed from the edge of a "stopband" spectral region that results from an approximately quarter-wave stack of high- and low-index thin-film layers. One limitation with such a combination of edge filters, however, is that conventional edge filters exhibit polarization splitting when operated at a non-zero angle of incidence.

By way of example only, FIG. 3 depicts calculated spectra associated with a combination of long-wave-pass and short-wave-pass filter coatings (FWHM~35 nm). Curves 301 and 302 (the latter of which is essentially flush with the abscissa) are calculated p- and s-polarized transmission spectra associated with an AOI of 60 degrees, curves 311 and 312 are calculated p- and s-polarized transmission spectra associated with an AOI of 45 degrees, curves 321 and 322 are calculated p- and s-polarized transmission spectra associated with an AOI of 30 degrees, and curves 330 are calculated p- and s-polarized transmission spectra associated with an AOI of 0 degrees. The exemplary combination of edge filters associated with FIG. 3 exhibits qualitatively similar behavior to the exemplary multi-cavity Fabry-Perot type filters of FIG. 2, but there is significantly more distortion of the spectrum as the AOI is increased from normal incidence. In particular, the passband ripple can render the filter unusable for p-polarization light, and the passband for s-polarization diminishes to where it is essentially eliminated for light at an AOI of 60 degrees. Consequently, the useful angular tuning range of the exemplary combination of edge filters associated with FIG. 3 is only about 10 degrees to 15 degrees for this filter, resulting in a wavelength tuning range of about 0.5%-1%.

More generally, increasing the AOI of a conventional interference filter from normal generally affects the spectrum of the filter in two ways. First, the features of the filter spectrum are shifted to shorter wavelengths. Second, as the angle of the filter is further increased from normal, the composite spectra of the filter progressively exhibits two distinct spectra: one for s-polarized light and one for p-polarized light. As used herein, the relative difference between the s- and p-polarized spectra at a given point is generally called "polarization splitting."

To illustrate this effect, reference is made to FIGS. 4A and 4B which are plots of polarization splitting as a function of AOI for a quarter wave stack based on $SiO_2$ and $Ta_2O_5$ centered at 500 nm. In the plot of FIG. 4A, the bandwidths of the stopbands associated with light of s-polarization and p-polarization are shown, with the bandwidths measured in so-called "g-space." The parameter $g=\lambda_0/\lambda$ is inversely proportional to wavelength and therefore directly proportional to optical frequency, and equals 1 at the wavelength $\lambda_0$ which is at the center of a fundamental stopband associated with a stack of thin film layers each equal to $\lambda_0/4n$ in thickness, where n is the index of refraction of each layer. The bandwidth in g-space is therefore equal to the difference between $\lambda_0/\lambda_S$ and $\lambda_0/\lambda_L$, where $\lambda_S$ and $\lambda_L$ are the short-wavelength and long-wavelength edges of the stopband, respectively. The polarization splitting in g-space is thus simply one half of the difference between the bandwidths in g-space for s-polarized and p-polarized light. As shown in FIG. 4B, the stack exhibits polarization splitting of about 0.04 g-numbers when operated at 45 degrees AOI. Increasing AOI to 60 degrees results in polarization splitting of almost 0.07 g-numbers. Decreasing AOI to 20 degrees results in polarization splitting of less than 0.01 g-numbers.

By way of example only, conventional dichroic optical filters exhibit substantial polarization splitting, particularly when operated at about 45 degrees AOI. This polarization splitting arises from the particular construction of a dichroic filter. As mentioned previously, conventional dichroic filters are generally made up of alternating thin material layers having differing refractive index. In addition to the refractive index of each layer being different than that of an adjacent layer, the effective refractive indices of each individual layer differ with respect to different polarizations of light. That is, the effective refractive index for a layer is different for p-polarized light than it is for s-polarized light. As a result, s-polarized and p-polarized light are shifted to different degrees upon passing through each layer in a dichroic filter. This difference in shift ultimately offsets the filter spectra corresponding to these differing polarizations, resulting in polarization splitting.

If a conventional dichroic filter is based on the first order stopband of an angle-matched quarter-wave stack, estimating the polarization splitting between the stopband bandwidths of the filter is relatively straightforward. That is, assuming the dichroic filter is made up of two materials having indices of $n_H$, and $n_L$, respectively, at 45 degree angle of incidence, the effective indices can be calculated as follows:

$$n_L^S = \sqrt{n_L^2 - \sin^2(AOI)} \quad (2)$$

$$n_H^S = \sqrt{n_H^2 - \sin^2(AOI)} \quad (3)$$

$$n_L^P = \frac{n_L^2}{\sqrt{n_L^2 - \sin^2(AOI)}} \quad (4)$$

$$n_H^P = \frac{n_H^2}{\sqrt{n_H^2 - \sin^2(AOI)}} \quad (5)$$

where:

AOI is the incident angle in air, which is assumed to be the incident medium;

$n_L^P$ and $n_L^S$ are the effective refractive index of the low index material in the dichroic stack for p-polarized light and s-polarized light, respectively;

$n_H^P$ and $n_H^S$ are the effective refractive index of the high index material in the dichroic stack for p-polarized light and s-polarized light, respectively; and $n_H^2$ and $n_L^2$ are the squares of the high and low refractive indexes, respectively, associated with the two materials, and which are independent of polarization.

The bandwidths and polarization splitting of the first-order stopband for the two polarizations may then be calculated as follows:

$$\Delta g^S = \frac{4}{\pi} \sin^{-1}\left(\frac{n_H^S - n_L^S}{n_H^S + n_L^S}\right) \quad (6)$$

$$\Delta g^P = \frac{4}{\pi} \sin^{-1}\left(\frac{n_H^P - n_L^P}{n_H^P + n_L^P}\right) \quad (7)$$

$$PS_g = \frac{\Delta g^S - \Delta g^P}{2} \quad (8)$$

where:

$\Delta g^S$ and $\Delta g^P$ are the bandwidths of the first order (fundamental) stopband for s-polarized light and p-polarized light, respectively, in g-space; and $PS_g$ is the polarization splitting for the first-order stopband in g-space.

Alternatively, the polarization splitting may be expressed in terms of wavelength. For example, $$PS_\lambda = \frac{\lambda_0}{1-\Delta g^S/2} - \frac{\lambda_0}{1-\Delta g^P/2} \quad (9)$$

where:
$PS_\lambda$ is the polarization splitting of the long-wavelength edge of the fundamental stopband (the edge associated with a long-pass filter).

Often this value is expressed as a dimensionless value by taking its ratio to the average wavelength of the edges associated with s- and p-polarizations and expressing it as a percentage.

Polarization splitting has been utilized to design polarizing filters where high transmission and blocking are achieved for p- and s-polarizations, respectively, over a defined wavelength band. However, in the context of edge filters and beamsplitter optical filters, polarization splitting severely limits the edge steepness of light having average polarization. Systems disclosed as utilizing such combinations of edge filters are those described in U.S. Pat. Nos. 3,864,037, 5,591,981, and 5,852,498.

U.S. Pat. Nos. 4,373,782 and 5,926,317 disclose an approach to minimizing the conventional spectral distortion of combinations of angle-tuned thin-film edge filters. For example, U.S. Pat. Nos. 4,373,782 and 5,926,317 disclose the use of a multi-layered multi-cavity Fabry-Perot type bandpass filters to allow some control of the spectral positioning of the passbands for s- and for p-polarization at a particular non-zero AOI. At a particular AOI (e.g., 45 degrees), it is possible to position the narrower s-polarization passband such that one of its edges lines up with the corresponding edge of the wider p-polarization passband, thus approximately eliminating the polarization splitting associated with either the long- or the short-wave-pass edge. Because of the significant difference in passband bandwidths for the two polarizations, however, and the correlation between passband bandwidth and edge steepness in a multi-cavity Fabry-Perot type filter, the two edges will conventionally have significantly different edge steepness. Furthermore, the passband width is conventionally very limited for edge filter applications due to the formation of the Fabry-Perot passband within the stopband region.

In a further method proposed by Thelen to minimize polarization splitting (see A. Thelen, *Design of Optical Interference Coatings*, McGraw Hill, 1989), the method utilizes tuning spacers of a multi-cavity Fabry-Perot bandpass filter to align the edges of spectrum of s- and p-polarized light. However, this method has significant limitations when used to create dichroic filters. Specifically, in this method, the starting layer structure is that of a multi-cavity Fabry-Perot bandpass filter with spacer layers having optical thickness equal to multiple half-waves of the reference wavelength used to define the associated stopband. In addition, the edge of the resulting dichroic must be essentially at the center of the associated stopband. It has been shown that decreasing stopband bandwidth can result in a corresponding decrease in polarization splitting. In the case of a filter having a second order stopband, the bandwidth of the stopband is proportional to the material mismatch in the dielectric stack making up the filter, where "mismatch" refers to the deviation of the layer thicknesses from one quarter of a wavelength, while keeping the sum of the thicknesses of each pair of high- and low-index layers equal to approximately one half of a wavelength. The greater the mismatch, the higher the degree of polarization splitting, and vice versa. Thus, it has been shown that polarization splitting can be minimized by utilizing different (e.g., higher-order) stopbands and adjusting material mismatch in the dielectric stack making up a dichroic filter.

However, while this method is effective, small mismatch always results in a filter having a narrow blocking region and lower blocking level, which is often not acceptable. Enhancement of the blocking region can be achieved, but only by increasing the number of layers in the dielectric stack. As a result, the performance of a traditional dichroic filter based on a second order stopband is typically limited by the maximum coating thickness allowed by the manufacturing process.

Higher-order stopbands are one reason why it is difficult to achieve high transmission at wavelengths shorter than those over which high blocking occurs. A stopband is a range of wavelengths over which transmitted light is strongly attenuated ($T \leq 10\%$) due to constructive interference of the many partial waves of light reflected off of a structure with a periodic or nearly periodic variation of the index of refraction, as found in a thin-film interference filter. For a "quarter wavelength stack" structure comprised of alternating layers of high- and low-index materials, each of which is approximately one quarter of a particular wavelength $\lambda_0$ thick (in the material), the "fundamental" stopband is roughly centered on $\lambda_0$ and ranges from approximately $\lambda_0/(1+x)$ to $\lambda_0/(1-x)$, where x is related to the high and low index of refraction values, $n_H$ and $n_L$, respectively, according to $$x = \frac{2}{\pi}\arcsin\left(\frac{n_H - n_L}{n_H + n_L}\right) \quad (10)$$

If the layer-to-layer index of refraction variation is not a purely sinusoidal variation, but rather changes abruptly, as is typically the case in a multi-layer thin-film interference filter, higher-order stopbands exist at shorter wavelengths. For example, a quarter-wave stack having such abrupt refractive index changes exhibits "odd-harmonic" stopbands that occur approximately at the wavelengths $\lambda_0/3$, $\lambda_0/5$, etc., and that range from approximately $\lambda_0/(3+x)$ to $\lambda_0/(3-x)$, for the third-order stopband, $\lambda_0/(5+x)$ to $\lambda_0/(5-x)$ for the fifth-order stopband, and so on. If the layers are not exactly a quarter-wave thick, there may also be "even-harmonic" stopbands that occur approximately at the wavelengths $\lambda_0/2$, $\lambda_0/4$, etc.

In general, known filters achieve high blocking over a wide range by utilizing a fundamental stopband, by combining multiple fundamental stopbands, or by "chirping" (gradually varying) the layers associated with one or more fundamental stopbands. Regardless of the approach, the higher-order harmonic stopbands associated with these blocking layers inhibit transmission at wavelengths shorter than the fundamental stopband or stopbands.

Liquid-crystal tunable filters (LCTF) are also designed to exhibit variable spectral functionality. LCTF's are based on a Lyot-Ohman polarization interference filter configuration (*Optical Waves in Layered Media*, Pochi Yeh, Wiley, New York, 1988, Section 10.1), which is a series of birefringent crystal plates separated by linear polarizers. Each "stage" of this filter produces a sinusoidal variation of transmission as a function of wavelength, and the combination of many stages each producing a sinusoidal transmission curve with a different frequency results in constructive interference of the overall transmission characteristic at just one wavelength: the filter passband. An LCTF adds birefringent liquid-crystal plates to the fixed birefringent plates in each section, such that an adjustment of the liquid-crystal birefringence by application of a voltage across these plates modifies the wavelength at which the constructive interference occurs, thus tuning the wavelength of the passband.

LCTF filters can be designed to tune over many 100's of nm. In particular, filters are available for tuning over the entire visible wavelength range (<400 nm to >700 nm). Like angle-tuned thin-film filters, they are capable of large apertures and two-dimensional imaging. Significant shortcomings of these filters include poor transmission, poor edge steepness and out-of-band blocking, fixed bandwidth, and low laser damage threshold (LDT). And, because they are based on polarization, they are strongly polarization dependent. In fact, they transmit only linearly polarized light, so the maximum transmission of unpolarized light is 50%, and in fact the transmission of even the polarized light passed through the filter tends to be about 50% (which results in 25% overall transmission for unpolarized light). An example of a filter based on ferroelectric liquid crystals is disclosed in U.S. Pat. No. 5,132,826.

A further conventional filter system designed to exhibit variable spectral functionality includes acousto-optic tunable filters (AOTF). The AOTF is based on the diffraction of light off of a volume grating formed by acoustic shear waves traveling in a single crystal of a material like tellurium dioxide ($TeO_2$). The waves are produced by a radio frequency (RF) transducer bonded to one side of the crystal. Light transmitted through the crystal is separated into three waves, each traveling in a different (angular) direction: a zeroth order undiffracted beam; a diffracted beam of one orientation of (linear) polarization; and a diffracted beam of the other (orthogonal) polarization. The undiffracted beam contains all wavelengths, whereas the diffracted beams contain only wavelengths within a narrow passband due to diffraction off of the volume hologram. To use the device as a filter, usually the undiffracted beam and one of the polarized diffracted beams are blocked, and the second polarized diffracted beam is used as the transmitted light.

AOTF filters also can exhibit a wide tuning range (like the LCTF it is also capable of tuning over 100's of nm), and can exhibit a high tuning speed (wavelength switching times as fast as 10 microseconds are possible, compared to milliseconds and above switching times for all other technologies). The most significant disadvantages include poor edge steepness and out-of-band blocking, lack of adjustable bandwidth, and very small apertures (typically 3 to 10 mm at most), which limits the usefulness for imaging applications. And, like the LCTF, AOTF's only use linearly polarized light, and thus for unpolarized light applications at least 50% of the light is lost. U.S. Pat. No. 5,796,512 provides an example of an imaging system that uses an AOTF.

A further conventional filter system designed to exhibit variable spectral functionality includes linear-variable tunable filters (LVTF): Linear (as well as circular) variable thin-film filters are based on the concept of non-uniform thin-film layer thickness variation as a function of position along a linear direction (for linear-variable filters) or around the azimuthal direction of a round filter (for circular-variable filters). As a result, the spectral properties of the LVTF filter, which scale with the layer thickness, vary spatially as well. Thus, by varying the location of an optical beam on the filter—either by moving the beam across the filter or moving the filter across the path of the beam—the spectral properties (such as the edge position of an edge filter or the passband wavelength of a bandpass filter) can be varied. U.S. Pat. No. 6,700,690 describes a combination of two LVTF's—one a long-wave-pass filter and the other a short-wave-pass filter—such that when they are translated independently not only the center wavelength formed by the combination of the two filters but also the bandwidth can be adjusted.

LVTF's share some of the characteristics of other tunable thin-film filters, including transmission properties, imaging properties, and they exhibit a relatively high laser damage threshold. In addition, because light is always incident at or near 0 degrees AOI they can be polarization insensitive. Moreover, using the configuration disclosed in U.S. Pat. No. 6,700,690, the bandwidth can be adjusted arbitrarily for any center wavelength. Disadvantages include poorer spectral performance (edge steepness) due to the variation of the spectral properties across a non-zero width optical beam, and slow tuning speed due to the need to translate the filters mechanically.

There exist a number of other thin-film and non-thin-film approaches to tunable optical filters capable of selecting a band of wavelengths from a two-dimensional imaging beam, including: bulk Sagnac, Mach-Zehnder, and Michelson type interferometers, Fabry-Perot interferometers, and thin-film filters with actively adjustable layers and/or substrate or tuned by mechanically induced changes in the optical properties via the stress-optic effect. As an example, "Tunable thin-film filters: review and perspectives," M. Lequime, *Proceedings of the SPIE*, Vol. 5250, pp. 302-311, 2003 (C. Amra, N. Kaiser, H. A. Macleod, Eds.) describes several such filter concepts.

Accordingly, there is a need to provide an optical filter with the spectral and two-dimensional imaging performance characteristics of thin-film filters and the center wavelength tuning flexibility of a diffraction grating.

SUMMARY

An embodiment of an optical filter consistent with the present disclosure comprises a first plurality of alternating first and second material layers, and a second plurality of alternating first and second material layers, each of the first and second material layers having respectively different refractive indices; where the first plurality of material layers exhibits a first surface with a first normal vector at a first angle to a first direction of incident electromagnetic radiation, and exhibits a tunable cut-on edge as a function of the first angle; and the second plurality of material layers exhibits a second surface with a second normal vector at a second angle to a second direction of the incident electromagnetic radiation, and exhibits a tunable cut-off edge as a function of the second angle; and where the polarization splitting of the first plurality of material layers at the cut-on edge, does not exceed approximately 1 percent of the wavelength at the cut-on edge as a function of the first angle for any first angle with a value between approximately 0 degrees and approximately 40 degrees; and where the polarization splitting of the second plurality of material layers at the cut-off edge does not exceed approximately 1 percent of the wavelength at the cut-off edge as a function of the second angle for any second angle with a value between approximately 0 degrees and approximately 40 degrees; and the value of the first angle and the value of the second angle are such that the second s-stopband wavelength is approximately less than or equal to the cut-on edge wavelength, which is less than the cut-off edge wavelength, which is approximately less than or equal to the first s-stopband wavelength.

A further embodiment of an optical filter consistent with the disclosure comprises at least one substrate, a first plurality of alternating first and second material layers, and a second plurality of alternating first and second material layers, each of the first and second material layers in said first and second pluralities having respectively different refractive indices, where the first plurality of alternating first and second material layers is configured to exhibit a first surface with a first normal vector at a first angle to a first direction of electromagnetic radiation incident on said first plurality and to exhibit a tunable cut-on edge at a first wavelength as a function of said first angle; and the second plurality of alternating first and second material layers is configured to exhibit a second surface with a second normal vector at a second angle to a second direction of said electromagnetic radiation incident on said second plurality and to exhibit a tunable cut-off edge at a second wavelength as a function of said second angle; where the first plurality of alternating first and second material layers exhibits a first polarization splitting at said first wavelength and a first s-stopband edge at a first s-stopband wavelength, all as a function of said first angle, for said electromagnetic radiation incident on said first plurality; and the second plurality of alternating first and second material layers exhibits a second polarization splitting at said second wavelength and a second s-stopband edge at a second s-stopband wavelength, all as a function of said second angle, for said electromagnetic radiation incident on said second plurality; and a first value of the first angle and a first value of the second angle are such that the second s-stopband wavelength is approximately≦said first wavelength, which is less than said second wavelength, which is approximately≦said first s-stopband wavelength, where the separation between the first wavelength determined by said first value of said first angle and the second wavelength determined by said first value of said second angle is a first passband region such that electromagnetic radiation in said first passband region is at least approximately 80% transmitted and the difference between said first wavelength determined by said first value of said first angle and said second wavelength determined by said first value of said second angle is a first passband width; and a second value of said first angle and a second value of said second angle are such that said second s-stopband wavelength is approximately≦said first wavelength, which is less than said second wavelength, which is approximately≦said first s-stopband wavelength, where the separation between the first wavelength determined by said second value of said first angle and the second wavelength determined by said second value of said second angle is a second passband region such that electromagnetic radiation in said second passband region is at least approximately 80% transmitted and the difference between said first wavelength determined by said second value of said first angle and said second wavelength determined by said second value of said second angle is a second passband width; and where the first polarization splitting does not exceed approximately 1 percent of the first wavelength as a function of said first angle for any first angle with a value between the first value of the first angle and the second value of said first angle; and the second polarization splitting does not exceed approximately 1 percent of the second wavelength as a function of the second angle for any second angle with a value between the first value of said second angle and the second value of said second angle; and the first wavelength determined by the second value of the first angle is approximately at least within six percent of the first wavelength determined by the first value of said first angle and the second wavelength determined by the second value of the second angle is approximately at least within six percent of the second wavelength determined by the first value of the second angle.

An embodiment of a method of making an optical filter consistent with the disclosure comprises, depositing a first plurality of alternating first and second material layers on a first substrate surface and depositing a second plurality of alternating first and second material layers on a second substrate surface, where each of the first and second material layers in the first and second pluralities have respectively different refractive indices; where the first plurality of alternating first and second material layers deposited on said first substrate surface is configured to exhibit a first surface with a first normal vector at a first angle to a first direction of electromagnetic radiation incident on said first plurality and to exhibit a tunable cut-on edge at a first wavelength as a function of said first angle; and where the second plurality of alternating first and second material layers deposited on the second substrate surface is configured to exhibit a second surface with a second normal vector at a second angle to a second direction of said electromagnetic radiation incident on the second plurality and to exhibit a tunable cut-off edge at a second wavelength as a function of said second angle; where the first plurality of alternating first and second material layers deposited on the first substrate surface is configured to exhibit a first polarization splitting at the first wavelength and a first s-stopband edge at a first s-stopband wavelength, all as a function of said first angle, for the electromagnetic radiation incident on the first plurality; and where the second plurality of alternating first and second material layers deposited on the second substrate surface is configured to exhibit a second polarization splitting at the second wavelength and a second s-stopband edge at a second s-stopband wavelength, all as a function of the second angle, for the electromagnetic radiation incident on the second plurality; and where the first polarization splitting does not exceed approximately 1 percent of the first wavelength as a function of said first angle for any first angle with a value between approximately 0 degrees and approximately 40 degrees; and where the second polarization splitting does not exceed approximately 1 percent of the second wavelength as a function of the second angle for any second angle with a value between approximately 0 degrees and approximately 40 degrees; and where the value of the first angle and the value of the second angle are such that the second s-stopband wavelength is approximately≦the first wavelength, which is less than the second wavelength, which is approximately≦the first s-stopband wavelength.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

The accompanying drawings which are incorporated in and constitute a part of this specification, illustrate embodiments and, together with the description, serve to explain the features, advantages, and principles of the disclosed embodiments.

FIG. 5 depicts a tunable bandpass filter comprised of tunable cut-on and cut-off filter coatings applied to opposite surfaces of a single glass substrate, and an optional extended-blocking filter used at normal incidence to provide out-of-band blocking over a relatively wide wavelength range, consistent with an embodiment;

DETAILED DESCRIPTION

Figure 1:
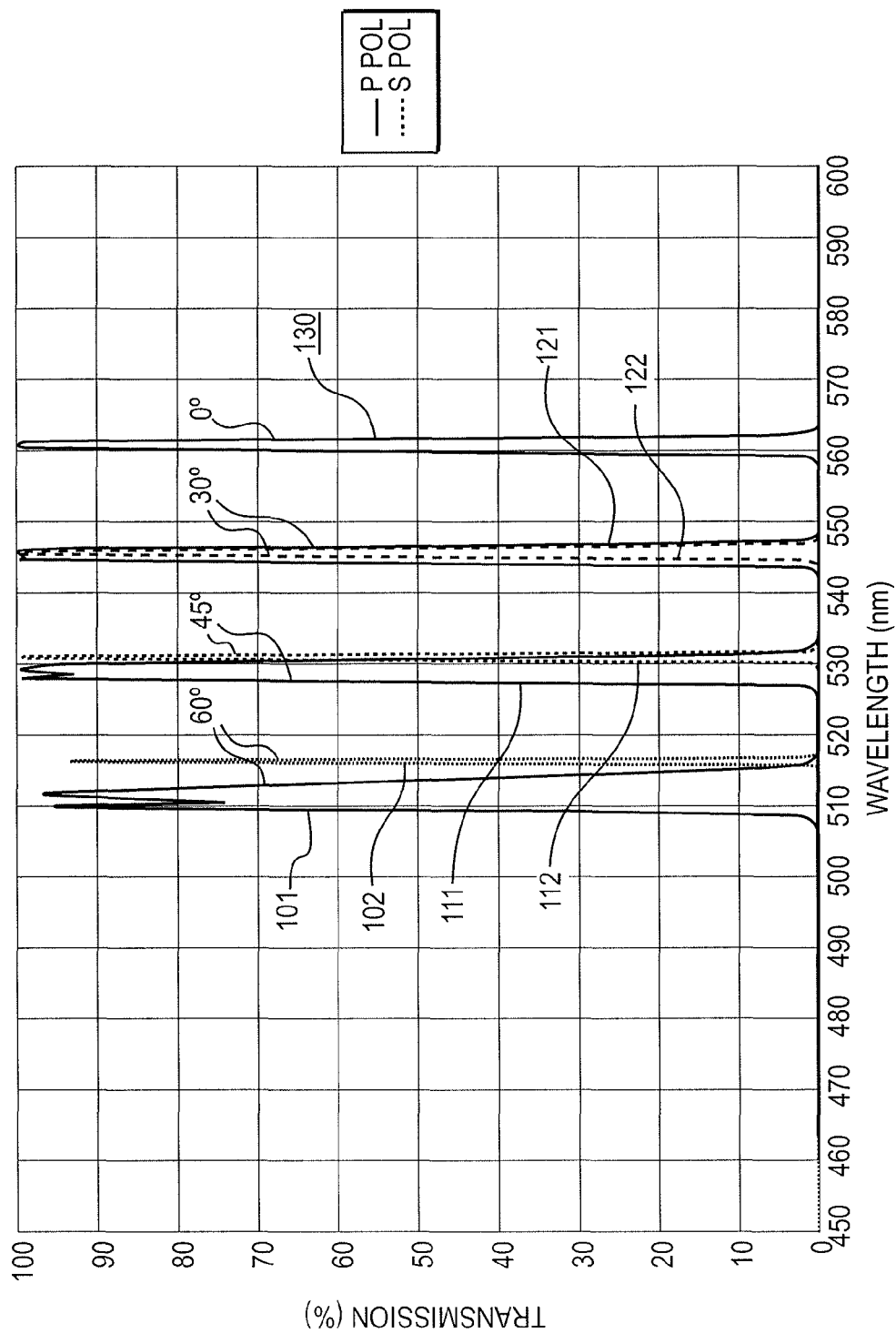
FIG. 1 depicts spectra associated with a known narrowband multi-cavity Fabry-Perot thin-film filter (FWHM ~2 nm)
Figure 2:
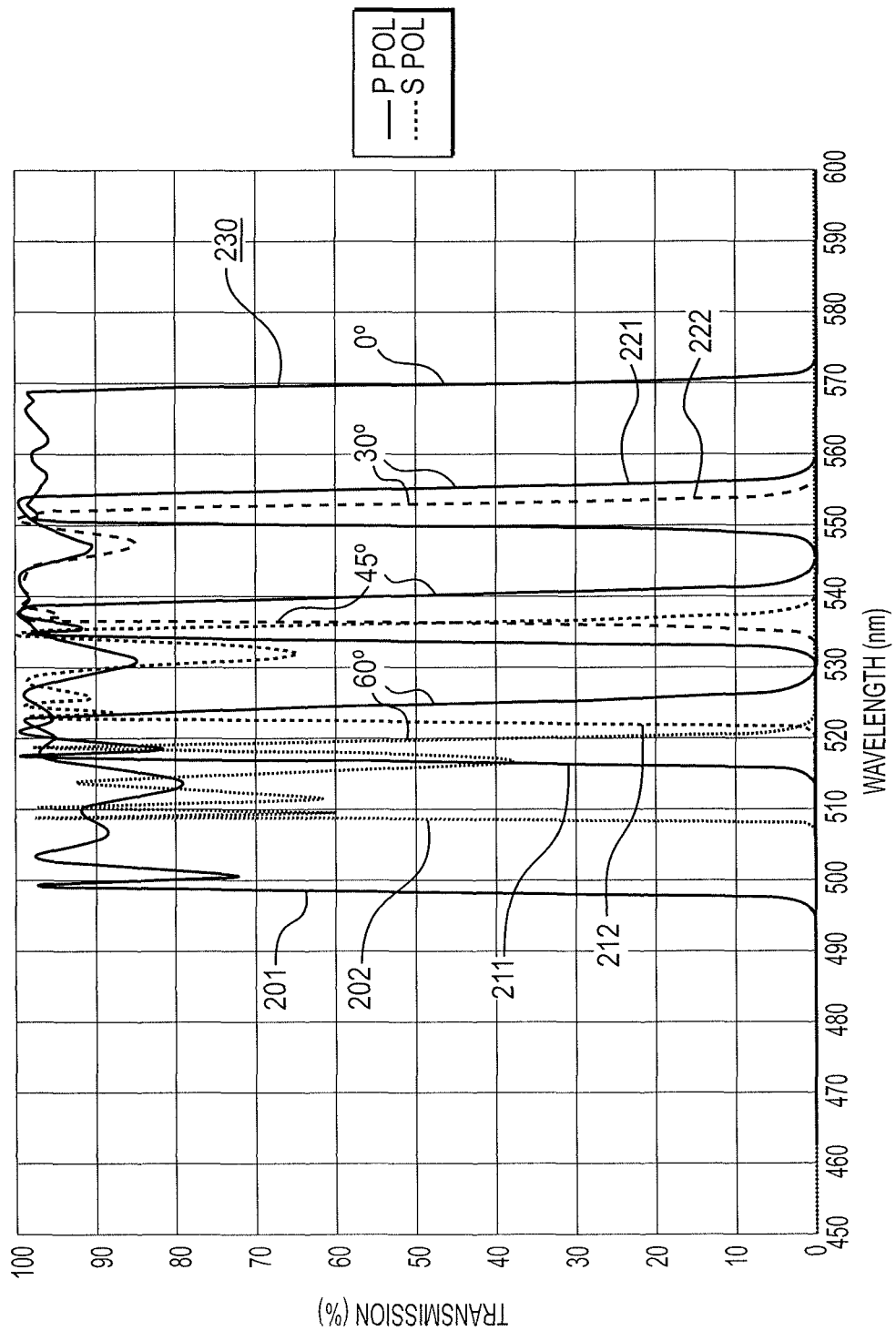
FIG. 2 depicts spectra associated with a multi-cavity Fabry-Perot thin-film filter with a relatively wide pass band at normal incidence (FWHM ~20 nm)
Figure 3:
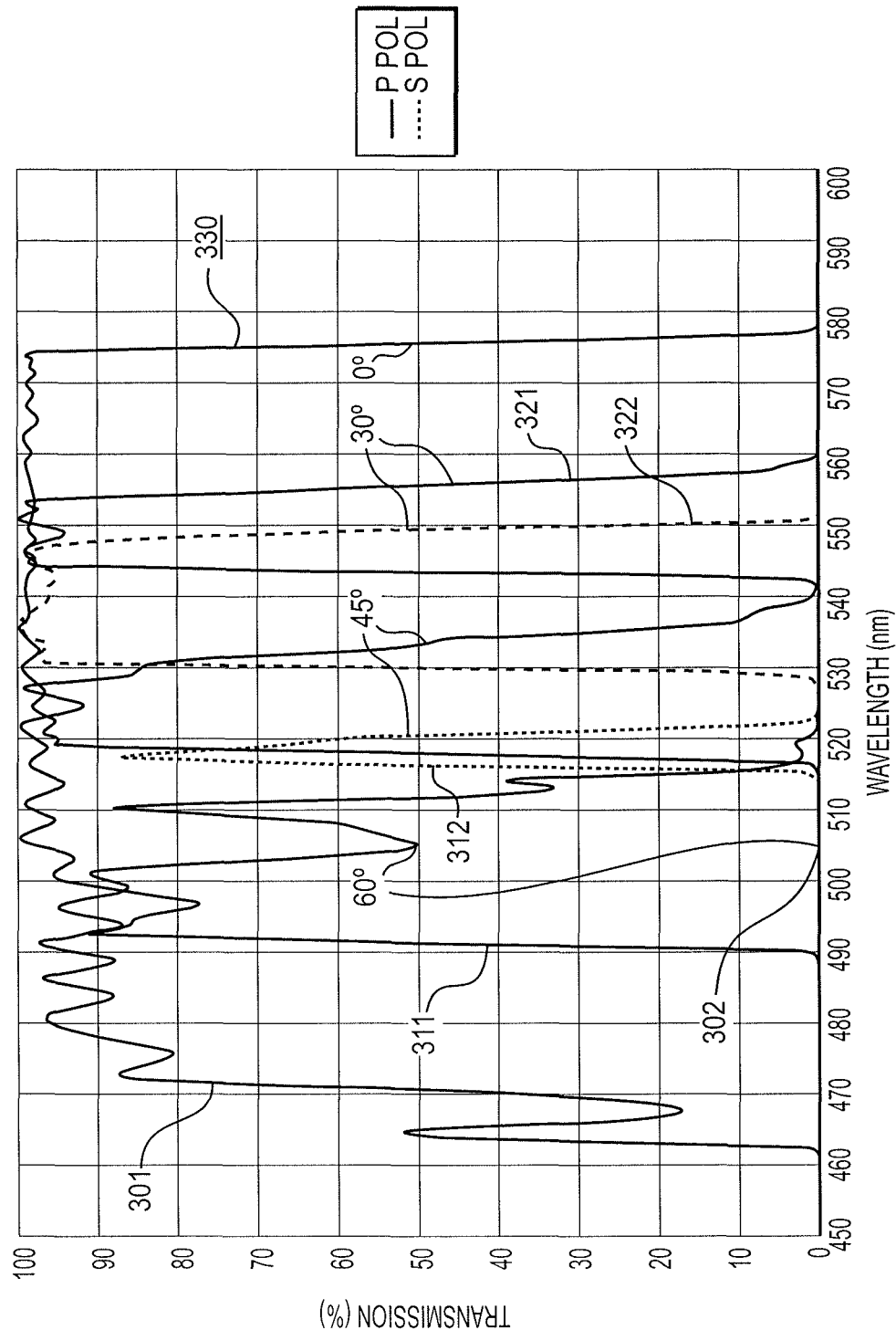
FIG. 3 depicts spectra associated with a known fluorescence bandpass thin-film filter comprised of a combination of long-wave-pass and short-wave-pass filter coatings (FWHM ~35 nm)
Figure 4A:
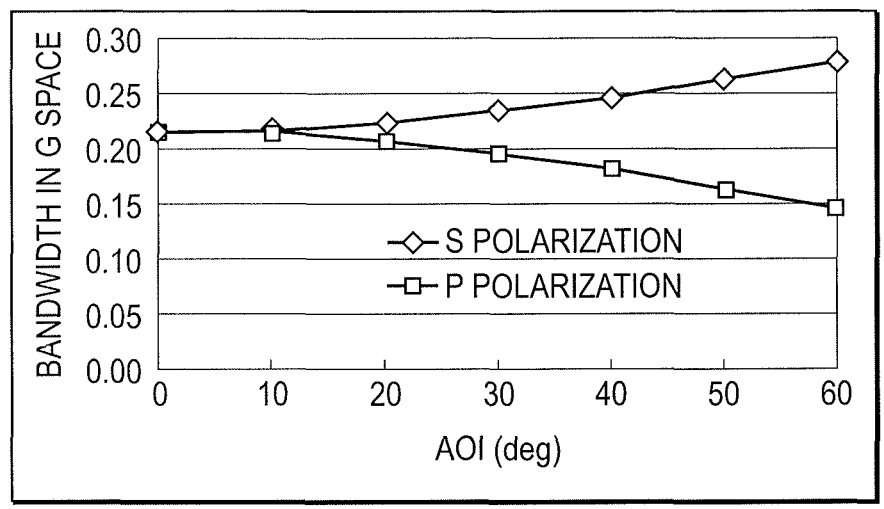
FIG. 4A is a plot of bandwidth in g-space as a function of AOI for a known quarter wave stack based on SiO$_2$ and Ta$_2$O$_5$ centered at 500 nm.
Figure 4B:
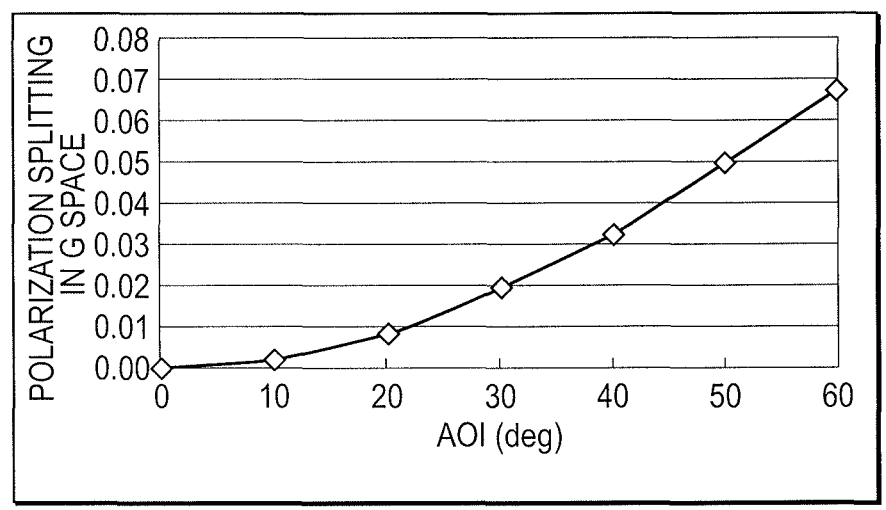
FIG. 4B is a plot of polarization splitting as a function of AOI for a known quarter wave stack based on SiO$_2$ and Ta$_2$O$_5$ centered at 500 nm.

Reference will now be made in detail to the present embodiments, examples of which are illustrated in the accompanying drawings. Wherever possible, the same reference numbers will be used throughout the drawings to refer to the same or like parts.

Embodiments consistent with this disclosure include edge filters (both long-wave-pass, or "cut-on," and short-wave-pass, or "cut-off," type filters) that operate at high angles of incidence with essentially no polarization splitting and exhibit nearly equal edge steepness for both polarizations of light. Embodiments consistent with this disclosure also include edge filters with high edge steepness values for both polarizations and exhibit substantially no polarization splitting at all angles of incidence from normal (0 degrees) to substantially ninety degrees. As a consequence, it is possible to angle-tune edge filters consistent with the disclosed embodiments, or a combination of edge filters consistent with the disclosed embodiments, over this full range of angles of incidence with little to no changes in the properties exhibited by the disclosed embodiments regardless of the state of polarization of the light passing through edge filters consistent with these embodiments. Thus, embodiments consistent with the disclosure include tunable thin-film filters which operate over a wide range of wavelengths, such as embodiments with substantially constant filter properties over as high as 12% of the filter edge- or center-wavelength at normal incidence. Embodiments consistent with the disclosure also include tunable thin-film filters that are tunable over a wider range, with different choices of materials for the high- and low-index of refraction layers.

Consistent with an embodiment, FIG. 5. depicts a tunable bandpass filter comprised of tunable cut-on and cut-off filter coatings applied to opposite surfaces of a single glass substrate and an optional extended-blocking filter used at normal incidence to provide substantial out-of-band blocking over a wide wavelength range. FIG. 5 includes bandpass filter 500 that includes glass substrate 503 with a tunable cut-on filter coating 501 on a first surface and a tunable cut-off filter coating 502 on a second surface. Consistent with an embodiment, both coatings 501, 502 could be combined into a single coating on a single surface of the substrate 503 with the second surface uncoated or coated with an anti-reflection (AR) coating, as described in U.S. patent application Ser. No. 11/896,589 ("Low Cost Filter for Fluorescence Systems"), the contents of which are incorporated by reference.

The arrangement depicted in FIG. 5 also illustrates extended blocking filter 510 that can be used in conjunction with bandpass filter 500 for light ray/beam 690 impinging on extended blocking filter 510 at normal incidence. Consistent with an embodiment, extended blocking filter 510 can include a coating or a combination of coatings with high transmission over the entire range of wavelengths accessible by bandpass filter 500, and significant blocking (attenuation) at wavelengths far away from the passband of bandpass filter 500 and which are not appreciably blocked by bandpass filter 500. Consistent with an embodiment, extended blocking filter 510 may include extended blocking cut-on filter coating 511 and extended blocking cut-off filter coating 512 on glass substrate 513. In addition, and consistent with an embodiment, extended blocking filter 510 is not required, but may be used to complement bandpass filter 500.

For example, extended blocking can be beneficial in many applications (e.g., blocking of light over the full range of sensitivity of the detector used in the system, such as UV to about 1100 nm for Si-based detectors including photodiodes and CCD/CMOS cameras) to eliminate excitation light or ambient light at the detector which could swamp an otherwise weak desired signal. However, because of the tendency for p-polarized light to exhibit greatly reduced reflectivity at high AOIs, it requires many more layers to block p-polarized light at high angles than at normal incidence. Therefore while it is possible to incorporate at least some degree of extended blocking over a wide wavelength range for all polarizations into bandpass filter 500 shown in FIG. 5, it is much less efficient to perform this blocking solely with bandpass filter 500 than it is with a secondary filter, such as extended blocking cut-on filter coating 511 and extended blocking cut-off filter coating 512, used at normal incidence (where efficiency here is used to refer to amount of blocking per net coating thickness).

Consistent with an embodiment, FIG. 5 also illustrates that as the filter wavelength is tuned by rotating (585) the orientation of bandpass filter 500, beam 690 emerging from bandpass filter 500 is translated laterally (i.e., in a direction perpendicular to the optical axis). The amount of lateral translation depends on the tuning angle and the thickness of substrate 503. For non-imaging systems this translation can be incorporated into the tolerances of the system design.

Figure 6:
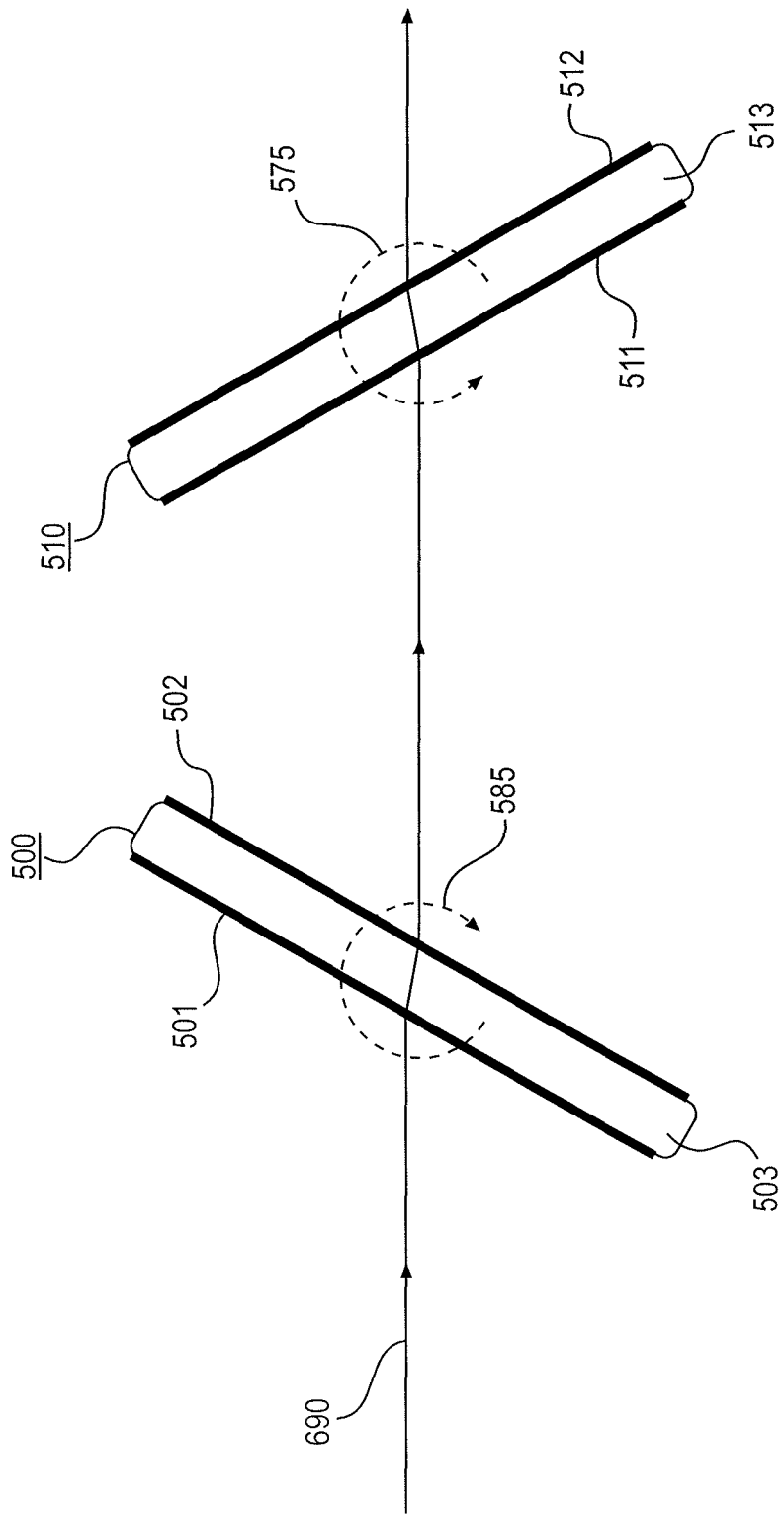
FIG. 6 is a further depiction of the embodiment of FIG. 5, with the extended-blocking filter counter-rotated to eliminate lateral translation of the incident light beam, also consistent with an embodiment.

Consistent with an embodiment, there are ways to eliminate the lateral beam translation. FIG. 6 depicts an assembly consistent with an embodiment in which extended-blocking filter 510 counter-rotates (575) as bandpass filter 500 is rotated. Consistent with an embodiment, this implementation comprises tunable bandpass filter 500, which includes tunable cut-on edge filter coating 501, tunable cut-off edge filter coating 502. Extended blocking filter 510 includes extended blocking cut-on edge filter coating 511 and extended blocking cut-off edge filter coating 512. Again, while the arrangement depicted in FIG. 6 eliminates lateral translation of beam 690, it is not as efficient as the use of a fixed-angle extended-blocking filter, since extended-blocking filter 510 will require many more layers to achieve high blocking at high values of AOI.

Figure 7:
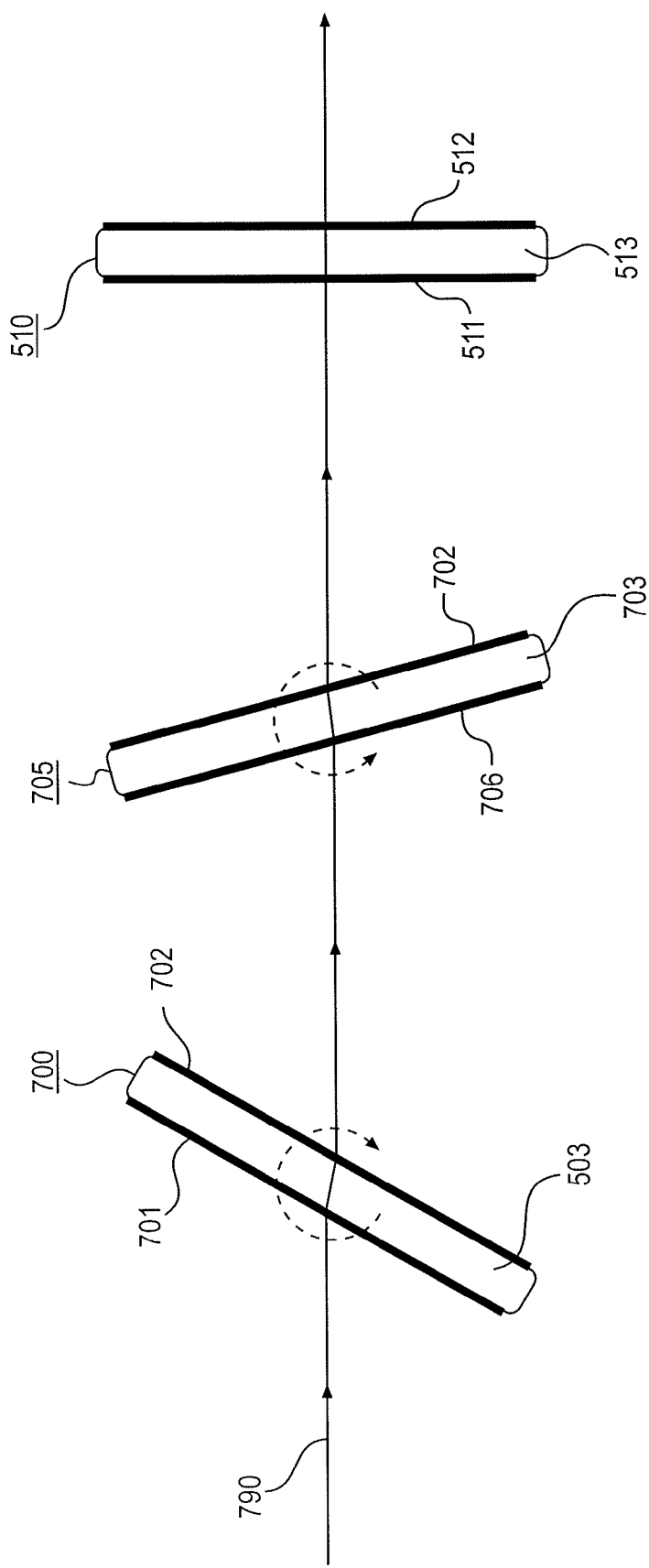
FIG. 7 depicts independent, counter-rotatable tunable edge filters, consistent with an embodiment.

An alternative arrangement consistent with an embodiment is to configure two filters, which counter-rotate, as shown in FIG. 7, where filter 700 includes tunable cut-on edge filter coating 701 and filter 705 contains tunable cut-off edge filter coating 706. The rotation angles of filter 700 and 705 can be correlated so that they are equal and opposite, thus eliminating lateral translation of beam 790 (where, for exemplary purposes only, the properties of filter 700 and filter 705 that determine a lateral translation are otherwise identical), with the resulting performance effectively being that of a tunable bandpass filter with a fixed passband width. However, as shown in FIG. 7, and consistent with an embodiment, filter 700 and filter 705 may be configured to rotate independently so that the wavelengths associated with cut-off edge filter 706 and cut-on edge filter 701 can be tuned independently, thus allowing for a tunable bandpass filter with an independently tunable bandwidth. Thus, consistent with an embodiment, filter 700 and filter 705 can be uncoated on the second surface, or coated with anti-reflective (AR) coating 702, or with an extended blocking coating (not depicted). In addition, consistent with an embodiment, extended blocking filter 510 with cut-on edge filter coating 511 and cut-off edge filter coating 512 may be used in combination with filter 700 and filter 705 to provide an efficient overall use of coating thickness.

Figure 8:
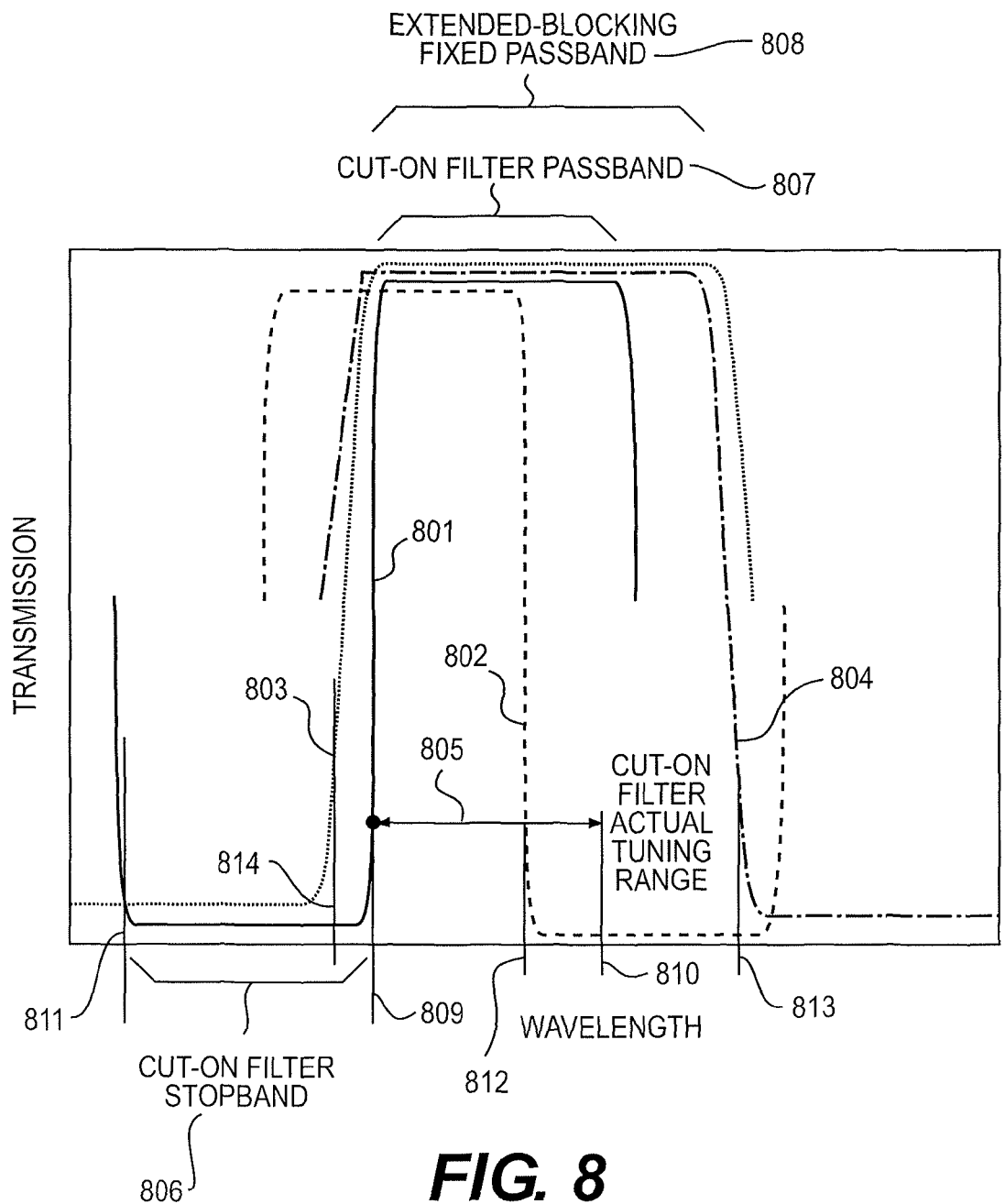
FIG. 8 depicts representative spectra of an embodiment with a combination of tunable cut-on and cut-off coatings, and further includes fixed or tunable extended-blocking coatings, consistent with an embodiment.

Consistent with an embodiment, FIG. 8 illustrates exemplary representative spectra (at a relatively large representative AOI for the tunable filters) associated with each of the embodiments depicted in FIGS. 5-7. Solid line 801 represents the spectrum of tunable cut-on edge filter coating 501 or 701, dashed line 802 represents the spectrum of tunable cut-off edge filter coating 502 or 706 at a relatively high AOI. Dotted line 803 represents the spectrum of extended blocking cut-on edge filter coating 511, and dashed-dotted line 804 represents the spectrum of extended blocking cut-off edge filter coating 512 (which is at a fixed AOI). Wavelengths 811 and 809 are associated with the edges of stopband 806 of cut-on edge filter coating 501 or 702 at a relatively high AOI. Range 805 (bounded by wavelengths 809 and 810) represents the tunable range associated with the stopband cut-on edge that borders passband 807 between an AOI of 0 degrees (edge 810) and the relatively high AOI associated with the depicted spectra of solid line 801 (edge 809). Wavelength 812 is associated with an edge nearest the passband of the stopband of cut-off edge filter coating 502 or 706. Wavelength 813 is associated with an edge nearest the passband of the stopband of extended blocking cut-off edge filter coating 512. Wavelength 814 is associated with an edge nearest the passband of the stopband of extended blocking cut-on edge filter coating 511. Passband 808 is associated with fixed extended blocking filter 510.

In order to achieve a relatively wide blocking filter consistent with an embodiment that includes a fixed extended-blocking complementary filter (as illustrated consistent with FIGS. 5 and 7), the effective tuning range of each tunable edge filter is the smallest of: the actual tuning range of the filter (i.e., how far the edge moves over the maximum angular range without appreciable distortion of the filter spectrum, such as range 805) and the stopband width. For exemplary purposes only, we consider a circumstance where the stopband width (such as the width of stopband 806) is smaller than the actual tuning range (such as range 805). (Note that the spectra in FIG. 8 does not necessarily reflect such a relationship. However, this does not diminish from the discussion below, which relies only upon the representative endpoints of the stopbands and tunable passbands). Under such an exemplary scenario, extended-blocking cut-on edge 814 can be placed at the smallest wavelength of the tunable cut-on edge filter stopband (i.e., a wavelength corresponding to edge 811) when the tunable edge filter is tuned to its longest wavelength (i.e., at normal incidence). (Note, further, that FIG. 8 does not depict the complete spectrum of a tunable cut-on edge filter coating at normal incidence. However, for purposes of discussion, we can assume that wavelength associated with edge 811 of the tunable cut-one edge filter shifts to a wavelength approximately the same as wavelength 814 at normal incidence.) Such a placement of extended blocking cut-on edge will limit the tuning range, since—according to the assumption that the stopband width is smaller than the tuning range—cut-on edge (i.e., wavelength 814) will be longer than the shortest wavelength achievable by the actual tuning range of the edge (i.e., wavelength 809). Under this same reasoning, the passband width of each tunable edge filter effectively sets an upper limit on the maximum bandwidth achievable by the bandpass characteristic that results from the combined spectra of the cut-on and cut-off tunable edge filters.

Conversely, and assuming the respective stopband width of each of the tunable cut-on edge filter and the tunable cut-off edge filter is larger than the actual tuning range of the the respective tunable cut-on edge filter and the tunable cut-off edge filter, then—consistent with an embodiment—if the fixed passband of the extended-blocking filter 510 is chosen to cover wavelengths from the shortest wavelength of the cut-on filter effective tuning range (i.e., wavelength $\lambda_S$, or wavelength 809) to the longest wavelength of the cut-off filter effective tuning range (i.e., wavelength $\lambda_L$, or the wavelength corresponding to edge 813 at normal incidence 810), then for the embodiment shown in FIG. 7 any arbitrary passband bandwidth can be chosen between zero and the least of: the difference of $\lambda_S-\lambda_L$, the passband width of tunable cut-on edge filter coating 701, and the passband width of the tunable cut-off edge filter coating 706. Furthermore, any center wavelength can be chosen subject to the constraint that the two bandpass filter edges must lie within the range $[\lambda_S, \lambda_L]$.

Moreover, consistent with an embodiment, in order for the combined filter to be capable of achieving arbitrarily small (e.g., ~0 nm wide) passband bandwidth at any center wavelength, the shortest wavelength of the effective tuning range of cut-off edge filter coating 706 must be less than or equal to the shortest wavelength of the effective tuning range of cut-on edge filter coating 701. Furthermore, as illustrated in FIG. 8, it is possible to configure the system so that the shortest wavelength of the effective tuning range of cut-off edge filter coating 706 is longer than the shortest wavelength of the effective tuning range of the cut-on edge filter coating 701, thus achieving a wider overall tuning range for the bandpass filter, but at the expense of putting a lower limit on the smallest achievable bandwidth of the bandpass filter at the lower and upper ends of the tuning range.

Consistent with an embodiment, the edge filters discussed herein make use of the spectral edge associated with a "passband defect" as described in U.S. patent application Ser. No. 12/129,534 ("Interference filter for non-zero angle of incidence spectroscopy," which discloses edge filters for use at approximately 45 degrees AOI), herein incorporated by reference, and Ser. No. 12/238,228 ("Optical thin-film notch filter with very wide passband regions," which discloses notch filters with relatively wide passbands), herein incorporated by reference.

Figure 9:
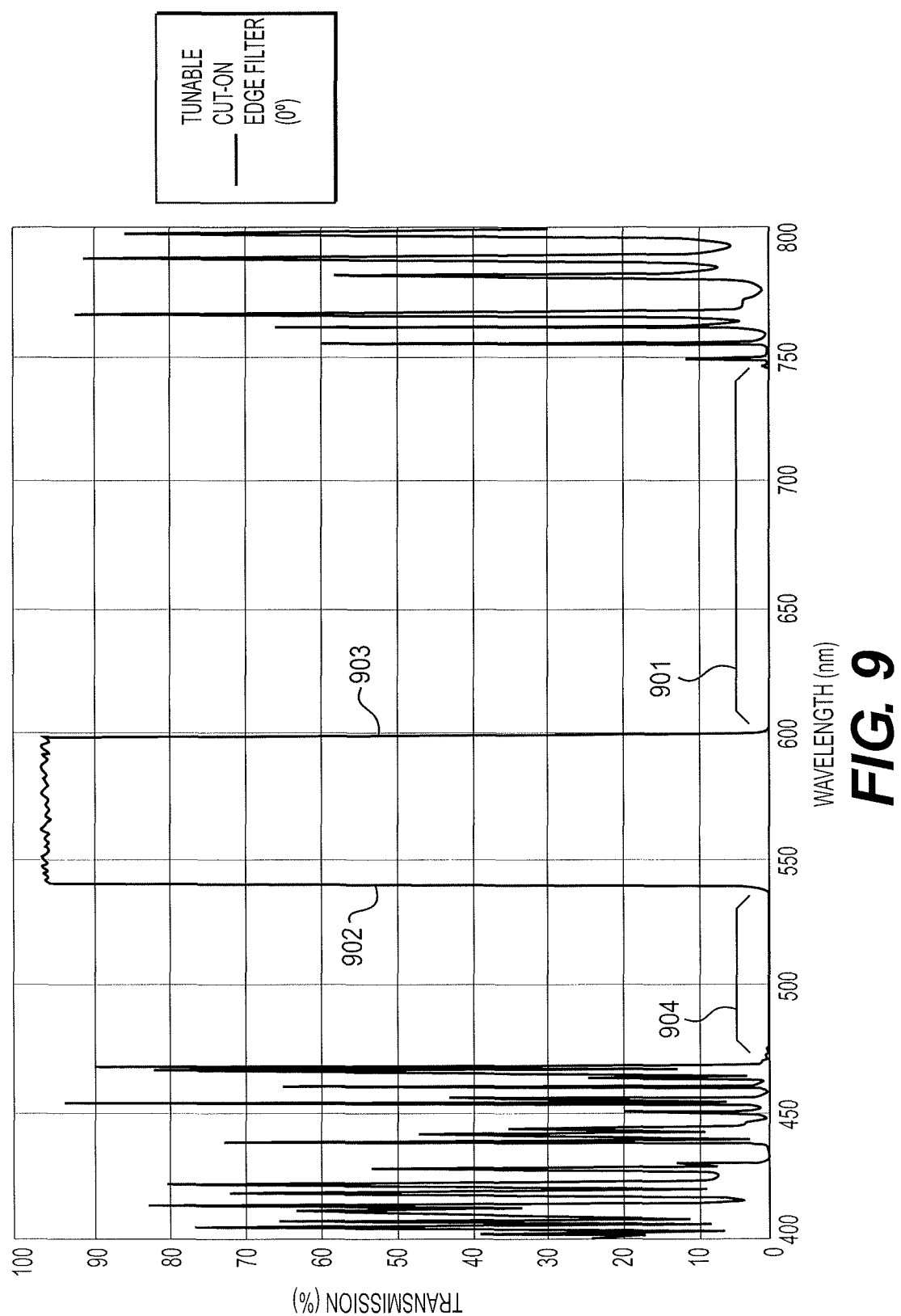
FIG. 9 depicts calculated spectra at normal incidence (AOI=0 degrees) for a tunable cut-on filter consistent with an embodiment.

Consistent with an embodiment, FIG. 9 depicts calculated spectra at normal incidence (AOI=0 degrees) of an exemplary tunable cut-on filter consistent with the present disclosure. The region from about 600 nm to about 750 nm is stopband 901 associated with the stack of alternating, approximately quarter-wavelength-thick high- and low-index-of-refraction thin-film layers that form a filter structure. Tunable cut-on edge 902 occurs at about 540 nm in this example. Cut-off stopband edge 903 occurs at about 600 nm, and below this wavelength is the passband region. For a typical cut-off (short-wave-pass) filter, the precise layer thicknesses of the approximately quarter-wavelength-thick layers are optimized to eliminate the ripple in the passband region below approximately 600 nm. However, the optimization can be directed carefully to enhance rather than eliminate the ripple over a limited range within the passband, thus resulting in a region of very low transmission called passband defect 904. As shown in FIG. 9, the defect occurs over a wide range from about 470 to about 540 nm. On the long-wavelength side of the passband defect, a highly sloped cut-on edge is formed at about 540 nm.

Figure 10:
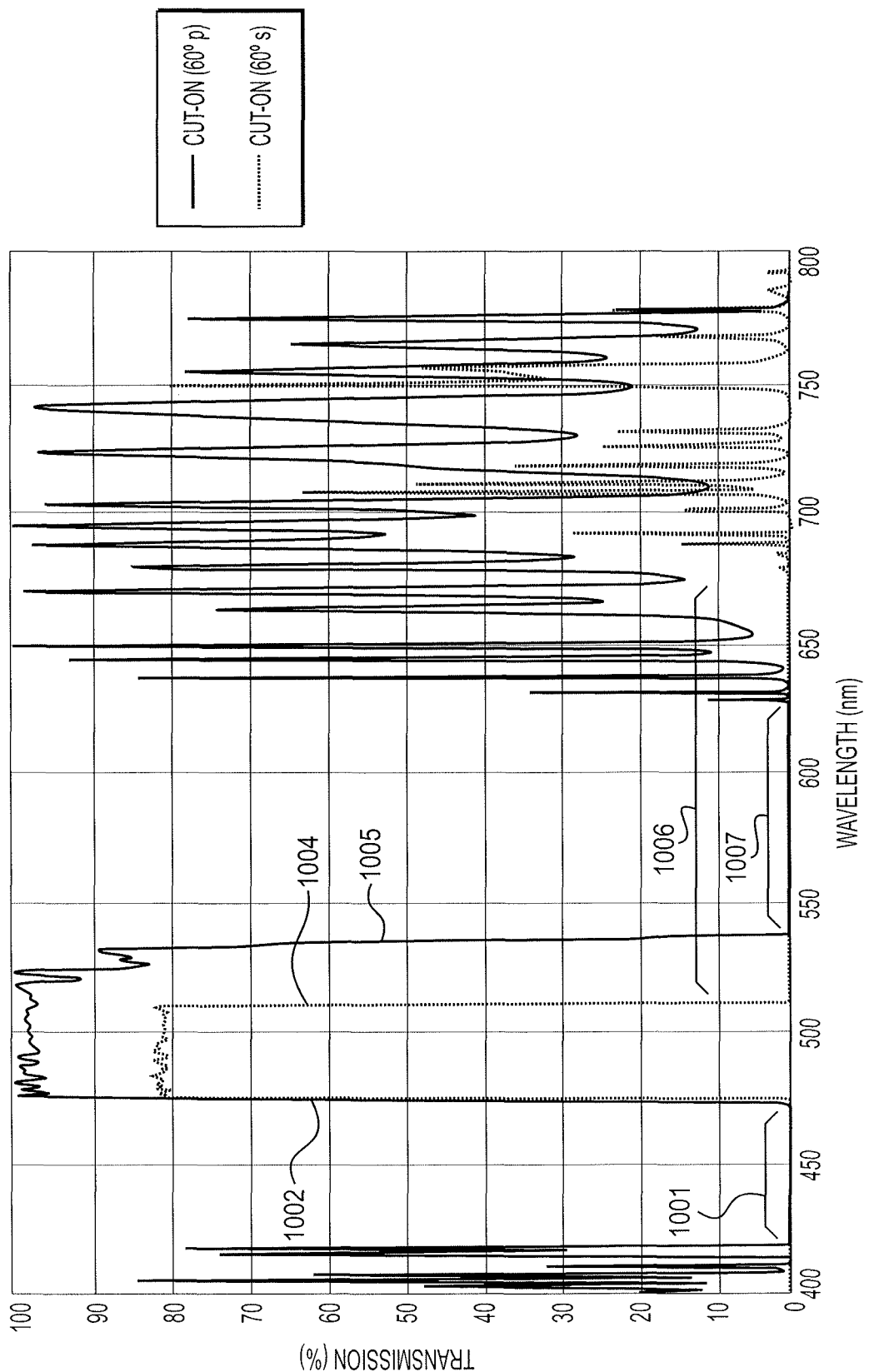
FIG. 10 depicts calculated spectra at AOI=60 degrees for a tunable cut-on filter consistent with an embodiment.

The tuning properties of filter assemblies consistent with the present disclosure become apparent when the spectra are calculated at higher values of the AOI. Consistent with an embodiment, FIG. 10 shows calculated spectra of the filter associated with FIG. 9 for AOI=60 degrees. Utilizing a filter assembly consistent with an embodiment, it is possible both to form passband defect 1001 within the passband associated with a quarter-wavelength stack structure, and to make passband defect 1001 reasonably wide with deep blocking, so that there is a highly sloped edge on at least one side of the defect. In addition, consistent with an embodiment, a sufficiently large number of thin-film layers allows enough degrees of freedom in the design of the system to optimize the structure so that passband defect cut-on edge 1002 associated with both polarization states ("s" and "p") are aligned to one another. Such an alignment of the two cut-on edges at about 475 nm is apparent in FIG. 10.

It is instructive to compare the lack of polarization splitting associated with the cut-on edge at about 475 nm to the splitting apparent at the main stopband cut-off edge (i.e., edges 1004 and 1005) between about 500 nm and about 550 nm, which splitting is about 30 nm, or about 6% of the edge wavelength. In contrast, the splitting associated with tunable passband defect edge 1002 is less than 1 nm, or about 0.2% of the edge wavelength. Consistent with an embodiment, achieving alignment of the passband defect edges 1002 associated with s- and p-polarized light is not an automatic feature of the passband defect: the thin-film layer structure must be optimized to achieve this result. As shown in FIG. 10, stopband (s) 1006 exists between about 520 nm and about 680 nm, and stopband (p) 1007 exists between about 540 nm and about 630 nm.

Consistent with an embodiment, the calculated spectrum in FIG. 9 assumes the coating is on the single side of a piece of glass that is uncoated on the second side, thus resulting in a loss due to reflection of about 4% (hence the 96% average transmission in the passband region).

The exemplary spectra depicted in FIGS. 9 and 10 are associated with the portion of an assembly consistent with an embodiment corresponding to a tunable cut-on edge filter. To form a tunable cut-off (short-wave-pass) edge filter, a passband defect is created to the long-wavelength side of the passband, with a highly sloped cut-off edge formed at the short-wavelength side of the passband defect. Accordingly, the tunable cut-off filter is the short-wavelength edge of this defect, and the passband associated with this tunable filter is the region between the stopband cut-on edge (which will exhibit significant polarization splitting when tuned) and the tunable cut-off edge.

Figure 11:
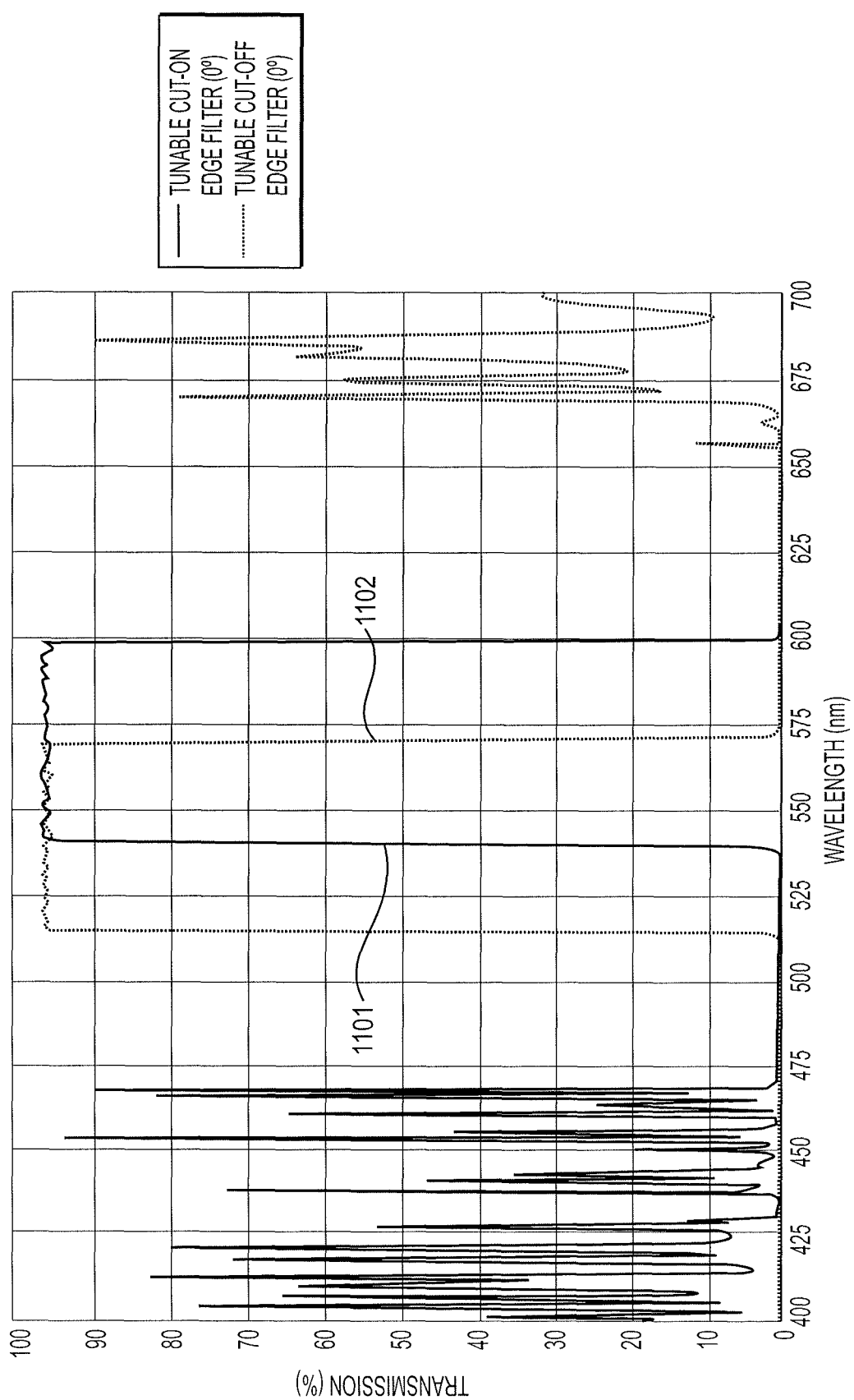
FIG. 11 depicts calculated spectra at normal incidence (AOI=0 degrees) associated with two tunable edge filters on separate substrates with uncoated back surfaces, consistent with an embodiment.
Figure 12:
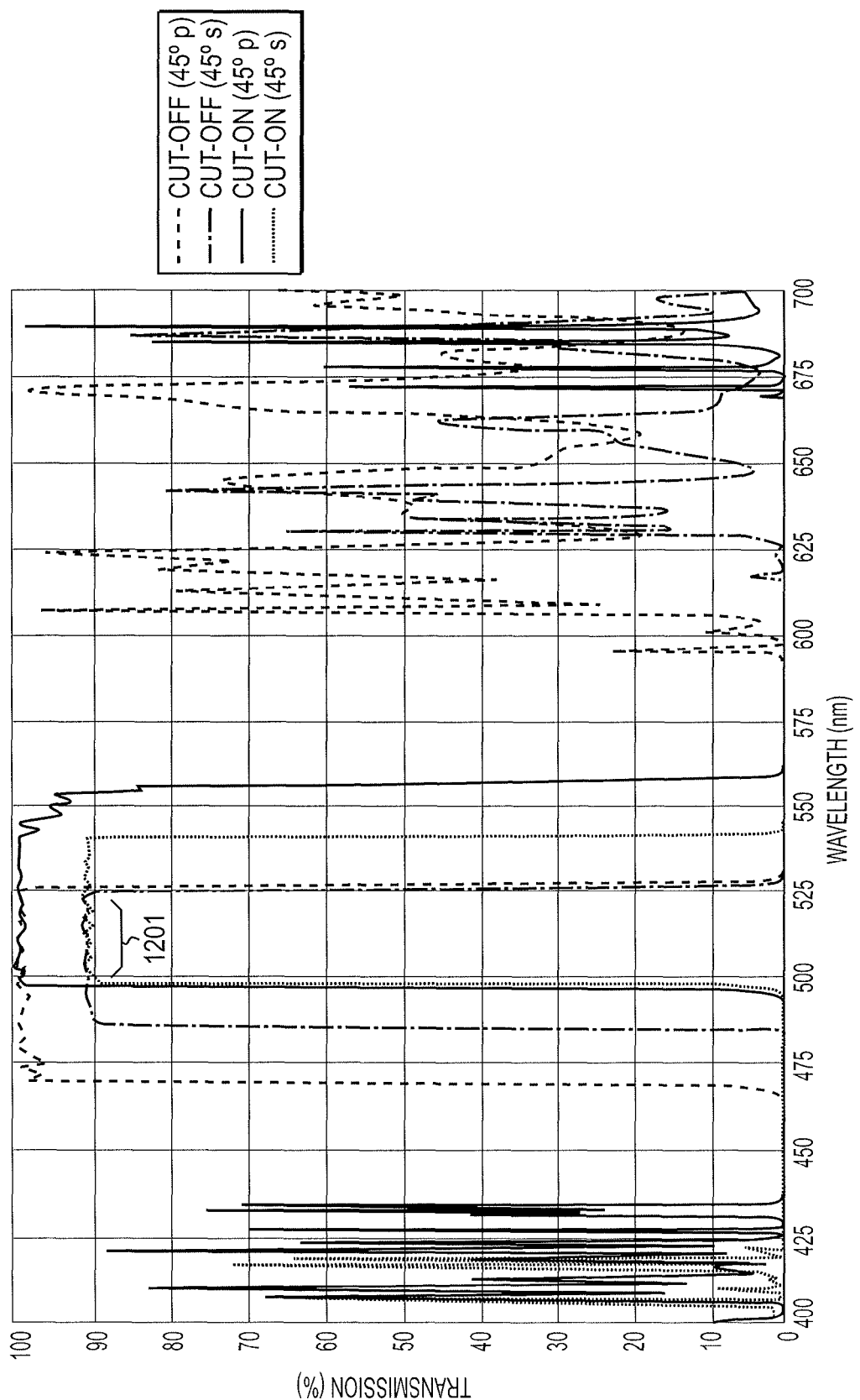
FIG. 12 depicts calculated spectra at AOI=45 degrees associated with two tunable edge filters on separate substrates with uncoated back surfaces, consistent with an embodiment.

Consistent with an embodiment, FIGS. 11 and 12 illustrate how a combination of tunable cut-on and cut-off filters forms a tunable bandpass filter. As discussed above, these two filters can be combined into a single coating on one substrate, or they can be coated onto the opposite sides of a single substrate, or they can be coated onto two, independently rotatable substrates to achieve independent tuning of the bandpass filter edges. Consistent with an embodiment, FIG. 11 shows calculated spectra of exemplary tunable cut-on edge filter 1101 and cut-off edge filter 1102 at normal incidence, where the calculation is consistent with an embodiment where each filter is coated onto a separate substrate, the backside of which is uncoated (and thus exhibits a 4% reflection loss). The passband of the resulting bandpass filter at AOI=0 degrees (as depicted in FIG. 11) is between about 540 nm and about 570 nm.

Consistent with an embodiment, FIG. 12 shows the calculated spectra that result when filters consistent with the disclosure are each tuned to an AOI of 45°. The center wavelength has shifted from about 555 nm to about 512 nm, and the passband 1201 is now between about 497 nm and about 527 nm. As shown in FIG. 12, the edge steepness and the passband bandwidth have both remained essentially unchanged relative to the values at normal incidence.

Figure 13:
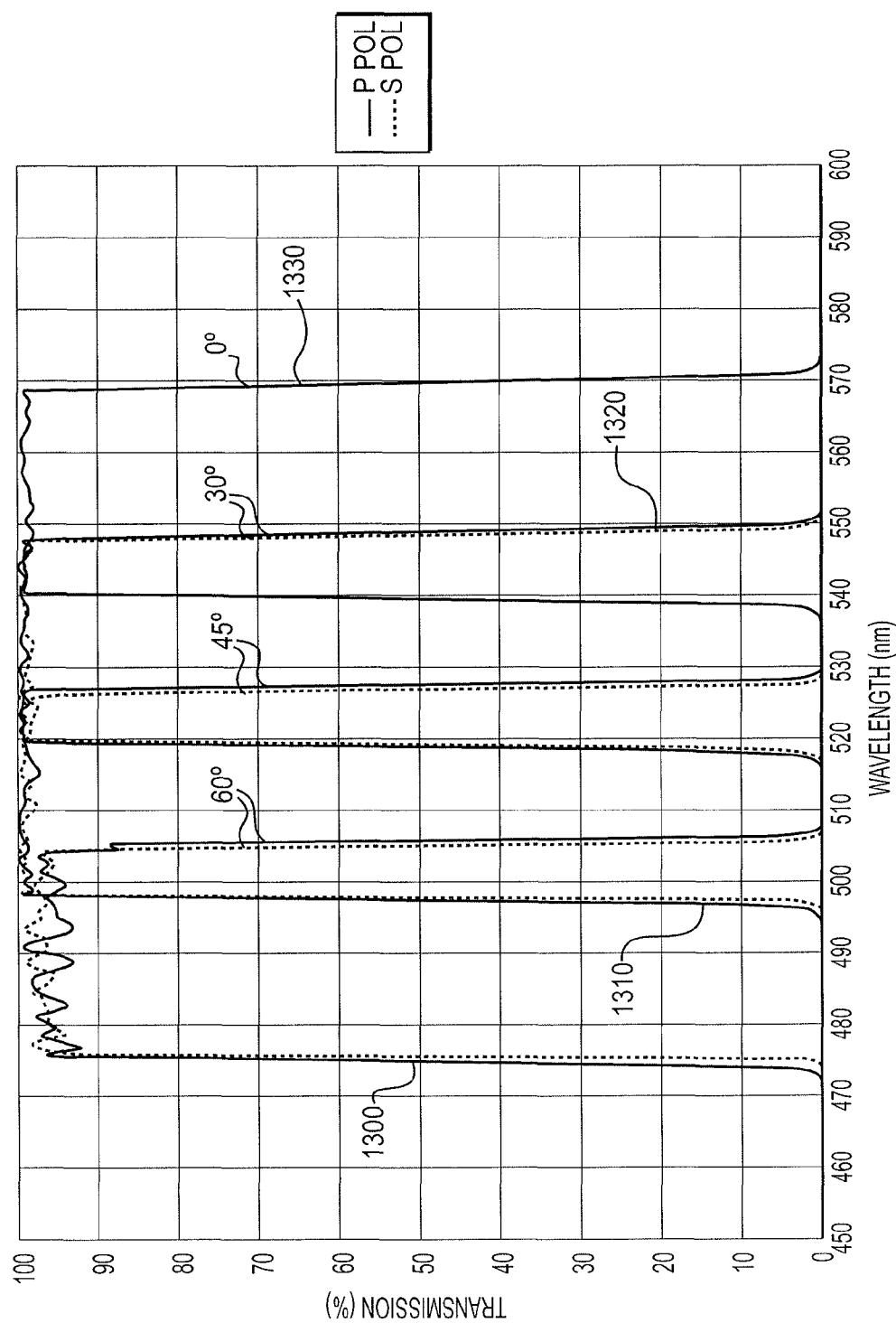
FIG. 13 depicts calculated spectra at AOI's from 0 to 60 degrees associated with two tunable edge filters coated on opposite sides of a single substrate, consistent with an embodiment.

Consistent with an embodiment, FIG. 13 depict calculated spectra for both polarizations of light at 4 different AOIs ranging from about 0 to about 60 degrees for a bandpass filter that results when exemplary tunable cut-on and cut-off filters are coated onto opposite sides of a single substrate. Curves 1300 depict spectra at an AOI of 60 degrees, curves 1310 depict spectra at an AOI of 45 degrees, curves 1320 depict spectra at an AOI of 30 degrees, and curves 1330 depict spectra at an AOI of 0 degrees. Consistent with an embodiment, thin-film layer structures (index values and thicknesses) associated with each of the coatings are given in TABLE 1. The spectra demonstrate the ability to tune from about 555 nm to about 490 nm, or about 12% of the center wavelength at normal incidence, while maintaining high transmission and steep edges regardless of polarization over the whole tuning range.

The following TABLE 1 includes an exemplary design for a tunable bandpass filter consistent with an embodiment. The exemplary filter comprises two coatings, and may be coated onto opposite sides of a single substrate or on two different substrates.

| Tunable Cut-on Filter Coating Thickness (μm): 15.147 Total Layers: 160 | | | Tunable Cut-off Filter Coating Thickness (μm): 14.162 Total Layers: 226 | | |
|---|---|---|---|---|---|
| Layer | Material | Thickness (nm) | Layer | Material | Thickness (nm) |
| 1 | Nb$_2$O$_5$ | 79.62 | 1 | Nb$_2$O$_5$ | 16.28 |
| 2 | SiO$_2$ | 143.02 | 2 | SiO$_2$ | 76.00 |
| 3 | Nb$_2$O$_5$ | 88.56 | 3 | Nb$_2$O$_5$ | 31.07 |
| 4 | SiO$_2$ | 113.99 | 4 | SiO$_2$ | 79.82 |
| 5 | Nb$_2$O$_5$ | 52.99 | 5 | Nb$_2$O$_5$ | 35.22 |
| 6 | SiO$_2$ | 112.11 | 6 | SiO$_2$ | 78.37 |
| 7 | Nb$_2$O$_5$ | 87.94 | 7 | Nb$_2$O$_5$ | 39.53 |
| 8 | SiO$_2$ | 139.73 | 8 | SiO$_2$ | 77.40 |
| 9 | Nb$_2$O$_5$ | 71.51 | 9 | Nb$_2$O$_5$ | 38.73 |
| 10 | SiO$_2$ | 78.08 | 10 | SiO$_2$ | 77.23 |
| 11 | Nb$_2$O$_5$ | 87.18 | 11 | Nb$_2$O$_5$ | 41.26 |
| 12 | SiO$_2$ | 108.18 | 12 | SiO$_2$ | 80.56 |
| 13 | Nb$_2$O$_5$ | 60.20 | 13 | Nb$_2$O$_5$ | 39.54 |
| 14 | SiO$_2$ | 136.64 | 14 | SiO$_2$ | 75.35 |
| 15 | Nb$_2$O$_5$ | 90.58 | 15 | Nb$_2$O$_5$ | 43.85 |
| 16 | SiO$_2$ | 112.46 | 16 | SiO$_2$ | 79.87 |
| 17 | Nb$_2$O$_5$ | 61.70 | 17 | Nb$_2$O$_5$ | 36.25 |
| 18 | SiO$_2$ | 88.27 | 18 | SiO$_2$ | 78.34 |
| 19 | Nb$_2$O$_5$ | 61.55 | 19 | Nb$_2$O$_5$ | 44.46 |
| 20 | SiO$_2$ | 130.56 | 20 | SiO$_2$ | 79.59 |
| 21 | Nb$_2$O$_5$ | 88.50 | 21 | Nb$_2$O$_5$ | 39.17 |
| 22 | SiO$_2$ | 131.47 | 22 | SiO$_2$ | 78.15 |
| 23 | Nb$_2$O$_5$ | 61.87 | 23 | Nb$_2$O$_5$ | 36.61 |
| 24 | SiO$_2$ | 114.88 | 24 | SiO$_2$ | 70.97 |
| 25 | Nb$_2$O$_5$ | 56.95 | 25 | Nb$_2$O$_5$ | 47.61 |
| 26 | SiO$_2$ | 79.55 | 26 | SiO$_2$ | 69.32 |
| 27 | Nb$_2$O$_5$ | 87.42 | 27 | Nb$_2$O$_5$ | 33.30 |
| 28 | SiO$_2$ | 147.01 | 28 | SiO$_2$ | 69.46 |
| 29 | Nb$_2$O$_5$ | 72.36 | 29 | Nb$_2$O$_5$ | 36.18 |
| 30 | SiO$_2$ | 101.27 | 30 | SiO$_2$ | 69.28 |
| 31 | Nb$_2$O$_5$ | 76.95 | 31 | Nb$_2$O$_5$ | 33.62 |
| 32 | SiO$_2$ | 106.97 | 32 | SiO$_2$ | 70.54 |
| 33 | Nb$_2$O$_5$ | 54.94 | 33 | Nb$_2$O$_5$ | 41.87 |
| 34 | SiO$_2$ | 119.04 | 34 | SiO$_2$ | 71.72 |
| 35 | Nb$_2$O$_5$ | 85.09 | 35 | Nb$_2$O$_5$ | 34.27 |
| 36 | SiO$_2$ | 148.11 | 36 | SiO$_2$ | 79.82 |
| 37 | Nb$_2$O$_5$ | 64.87 | 37 | Nb$_2$O$_5$ | 47.39 |
| 38 | SiO$_2$ | 94.23 | 38 | SiO$_2$ | 72.97 |
| 39 | Nb$_2$O$_5$ | 56.43 | 39 | Nb$_2$O$_5$ | 39.51 |
| 40 | SiO$_2$ | 94.82 | 40 | SiO$_2$ | 72.57 |
| 41 | Nb$_2$O$_5$ | 75.46 | 41 | Nb$_2$O$_5$ | 46.18 |
| 42 | SiO$_2$ | 147.35 | 42 | SiO$_2$ | 77.98 |
| 43 | Nb$_2$O$_5$ | 81.59 | 43 | Nb$_2$O$_5$ | 33.00 |
| 44 | SiO$_2$ | 113.63 | 44 | SiO$_2$ | 73.78 |
| 45 | Nb$_2$O$_5$ | 61.72 | 45 | Nb$_2$O$_5$ | 68.34 |
| 46 | SiO$_2$ | 99.63 | 46 | SiO$_2$ | 75.82 |
| 47 | Nb$_2$O$_5$ | 45.14 | 47 | Nb$_2$O$_5$ | 36.46 |
| 48 | SiO$_2$ | 133.52 | 48 | SiO$_2$ | 73.91 |
| 49 | Nb$_2$O$_5$ | 87.41 | 49 | Nb$_2$O$_5$ | 33.86 |
| 50 | SiO$_2$ | 126.96 | 50 | SiO$_2$ | 74.41 |
| 51 | Nb$_2$O$_5$ | 68.42 | 51 | Nb$_2$O$_5$ | 58.97 |
| 52 | SiO$_2$ | 121.48 | 52 | SiO$_2$ | 77.88 |
| 53 | Nb$_2$O$_5$ | 68.14 | 53 | Nb$_2$O$_5$ | 62.61 |
| 54 | SiO$_2$ | 91.75 | 54 | SiO$_2$ | 69.22 |
| 55 | Nb$_2$O$_5$ | 63.22 | 55 | Nb$_2$O$_5$ | 34.22 |
| 56 | SiO$_2$ | 132.76 | 56 | SiO$_2$ | 68.85 |
| 57 | Nb$_2$O$_5$ | 85.98 | 57 | Nb$_2$O$_5$ | 35.08 |
| 58 | SiO$_2$ | 138.56 | 58 | SiO$_2$ | 79.52 |
| 59 | Nb$_2$O$_5$ | 55.51 | 59 | Nb$_2$O$_5$ | 70.00 |
| 60 | SiO$_2$ | 99.35 | 60 | SiO$_2$ | 77.73 |
| 61 | Nb$_2$O$_5$ | 57.69 | 61 | Nb$_2$O$_5$ | 64.49 |
| 62 | SiO$_2$ | 104.16 | 62 | SiO$_2$ | 68.89 |
| 63 | Nb$_2$O$_5$ | 79.13 | 63 | Nb$_2$O$_5$ | 33.00 |
| 64 | SiO$_2$ | 147.93 | 64 | SiO$_2$ | 68.77 |
| 65 | Nb$_2$O$_5$ | 78.46 | 65 | Nb$_2$O$_5$ | 35.20 |
| 66 | SiO$_2$ | 106.40 | 66 | SiO$_2$ | 76.32 |
| 67 | Nb$_2$O$_5$ | 57.64 | 67 | Nb$_2$O$_5$ | 67.19 |
| 68 | SiO$_2$ | 95.74 | 68 | SiO$_2$ | 79.66 |
| 69 | Nb$_2$O$_5$ | 54.99 | 69 | Nb$_2$O$_5$ | 69.45 |
| 70 | SiO$_2$ | 140.42 | 70 | SiO$_2$ | 71.03 |
| 71 | Nb$_2$O$_5$ | 87.40 | 71 | Nb$_2$O$_5$ | 37.30 |
| 72 | SiO$_2$ | 123.90 | 72 | SiO$_2$ | 67.48 |
| 73 | Nb$_2$O$_5$ | 61.02 | 73 | Nb$_2$O$_5$ | 33.00 |
| 74 | SiO$_2$ | 118.43 | 74 | SiO$_2$ | 69.14 |
| 75 | Nb$_2$O$_5$ | 68.82 | 75 | Nb$_2$O$_5$ | 59.63 |
| 76 | SiO$_2$ | 97.00 | 76 | SiO$_2$ | 87.57 |
| 77 | Nb$_2$O$_5$ | 69.17 | 77 | Nb$_2$O$_5$ | 70.00 |
| 78 | SiO$_2$ | 136.63 | 78 | SiO$_2$ | 82.80 |
| 79 | Nb$_2$O$_5$ | 86.90 | 79 | Nb$_2$O$_5$ | 39.96 |
| 80 | SiO$_2$ | 123.87 | 80 | SiO$_2$ | 68.50 |
| 81 | Nb$_2$O$_5$ | 48.87 | 81 | Nb$_2$O$_5$ | 33.00 |
| 82 | SiO$_2$ | 109.79 | 82 | SiO$_2$ | 68.61 |
| 83 | Nb$_2$O$_5$ | 56.13 | 83 | Nb$_2$O$_5$ | 47.09 |
| 84 | SiO$_2$ | 112.39 | 84 | SiO$_2$ | 84.22 |
| 85 | Nb$_2$O$_5$ | 85.35 | 85 | Nb$_2$O$_5$ | 70.00 |
| 86 | SiO$_2$ | 146.97 | 86 | SiO$_2$ | 83.29 |
| 87 | Nb$_2$O$_5$ | 70.39 | 87 | Nb$_2$O$_5$ | 52.36 |
| 88 | SiO$_2$ | 98.69 | 88 | SiO$_2$ | 68.45 |
| 89 | Nb$_2$O$_5$ | 54.30 | 89 | Nb$_2$O$_5$ | 33.00 |
| 90 | SiO$_2$ | 105.08 | 90 | SiO$_2$ | 66.24 |
| 91 | Nb$_2$O$_5$ | 65.24 | 91 | Nb$_2$O$_5$ | 40.27 |
| 92 | SiO$_2$ | 141.58 | 92 | SiO$_2$ | 76.12 |
| 93 | Nb$_2$O$_5$ | 88.54 | 93 | Nb$_2$O$_5$ | 70.00 |
| 94 | SiO$_2$ | 118.07 | 94 | SiO$_2$ | 82.66 |
| 95 | Nb$_2$O$_5$ | 56.23 | 95 | Nb$_2$O$_5$ | 70.00 |
| 96 | SiO$_2$ | 105.15 | 96 | SiO$_2$ | 73.41 |
| 97 | Nb$_2$O$_5$ | 54.91 | 97 | Nb$_2$O$_5$ | 34.27 |
| 98 | SiO$_2$ | 109.67 | 98 | SiO$_2$ | 67.05 |
| 99 | Nb$_2$O$_5$ | 86.13 | 99 | Nb$_2$O$_5$ | 33.00 |
| 100 | SiO$_2$ | 147.28 | 100 | SiO$_2$ | 68.79 |
| 101 | Nb$_2$O$_5$ | 72.16 | 101 | Nb$_2$O$_5$ | 63.63 |
| 102 | SiO$_2$ | 95.49 | 102 | SiO$_2$ | 84.10 |
| 103 | Nb$_2$O$_5$ | 56.42 | 103 | Nb$_2$O$_5$ | 70.00 |
| 104 | SiO$_2$ | 94.58 | 104 | SiO$_2$ | 87.41 |
| 105 | Nb$_2$O$_5$ | 68.76 | 105 | Nb$_2$O$_5$ | 40.74 |
| 106 | SiO$_2$ | 147.05 | 106 | SiO$_2$ | 67.43 |
| 107 | Nb$_2$O$_5$ | 90.11 | 107 | Nb$_2$O$_5$ | 33.00 |
| 108 | SiO$_2$ | 103.81 | 108 | SiO$_2$ | 66.16 |
| 109 | Nb$_2$O$_5$ | 58.34 | 109 | Nb$_2$O$_5$ | 47.90 |
| 110 | SiO$_2$ | 101.29 | 110 | SiO$_2$ | 81.51 |
| 111 | Nb$_2$O$_5$ | 53.83 | 111 | Nb$_2$O$_5$ | 70.00 |
| 112 | SiO$_2$ | 122.10 | 112 | SiO$_2$ | 77.80 |
| 113 | Nb$_2$O$_5$ | 97.08 | 113 | Nb$_2$O$_5$ | 62.53 |
| 114 | SiO$_2$ | 133.66 | 114 | SiO$_2$ | 67.85 |
| 115 | Nb$_2$O$_5$ | 58.35 | 115 | Nb$_2$O$_5$ | 33.00 |
| 116 | SiO$_2$ | 91.80 | 116 | SiO$_2$ | 67.37 |
| 117 | Nb$_2$O$_5$ | 58.26 | 117 | Nb$_2$O$_5$ | 33.00 |
| 118 | SiO$_2$ | 89.44 | 118 | SiO$_2$ | 77.93 |
| 119 | Nb$_2$O$_5$ | 112.73 | 119 | Nb$_2$O$_5$ | 69.69 |
| 120 | SiO$_2$ | 139.39 | 120 | SiO$_2$ | 91.42 |
| 121 | Nb$_2$O$_5$ | 42.64 | 121 | Nb$_2$O$_5$ | 69.63 |
| 122 | SiO$_2$ | 287.33 | 122 | SiO$_2$ | 68.92 |
| 123 | Nb$_2$O$_5$ | 40.25 | 123 | Nb$_2$O$_5$ | 50.41 |
| 124 | SiO$_2$ | 117.15 | 124 | SiO$_2$ | 54.10 |
| 125 | Nb$_2$O$_5$ | 125.25 | 125 | Nb$_2$O$_5$ | 33.00 |
| 126 | SiO$_2$ | 112.26 | 126 | SiO$_2$ | 71.34 |
| 127 | Nb$_2$O$_5$ | 22.46 | 127 | Nb$_2$O$_5$ | 44.78 |
| 128 | SiO$_2$ | 107.64 | 128 | SiO$_2$ | 101.24 |
| 129 | Nb$_2$O$_5$ | 63.29 | 129 | Nb$_2$O$_5$ | 70.00 |
| 130 | SiO$_2$ | 75.86 | 130 | SiO$_2$ | 77.75 |
| 131 | Nb$_2$O$_5$ | 132.55 | 131 | Nb$_2$O$_5$ | 70.00 |
| 132 | SiO$_2$ | 274.07 | 132 | SiO$_2$ | 57.29 |
| 133 | Nb$_2$O$_5$ | 60.20 | 133 | Nb$_2$O$_5$ | 33.30 |

| Tunable Cut-on Filter Coating Thickness (μm): 15.147 Total Layers: 160 | | | Tunable Cut-off Filter Coating Thickness (μm): 14.162 Total Layers: 226 | | |
|---|---|---|---|---|---|
| Layer | Material | Thickness (nm) | Layer | Material | Thickness (nm) |
| 134 | $SiO_2$ | 96.56 | 134 | $SiO_2$ | 66.71 |
| 135 | $Nb_2O_5$ | 34.66 | 135 | $Nb_2O_5$ | 33.00 |
| 136 | $SiO_2$ | 148.13 | 136 | $SiO_2$ | 80.23 |
| 137 | $Nb_2O_5$ | 104.56 | 137 | $Nb_2O_5$ | 64.91 |
| 138 | $SiO_2$ | 117.16 | 138 | $SiO_2$ | 103.73 |
| 139 | $Nb_2O_5$ | 47.29 | 139 | $Nb_2O_5$ | 70.00 |
| 140 | $SiO_2$ | 106.96 | 140 | $SiO_2$ | 73.45 |
| 141 | $Nb_2O_5$ | 47.67 | 141 | $Nb_2O_5$ | 43.20 |
| 142 | $SiO_2$ | 129.84 | 142 | $SiO_2$ | 63.00 |
| 143 | $Nb_2O_5$ | 101.57 | 143 | $Nb_2O_5$ | 33.00 |
| 144 | $SiO_2$ | 128.97 | 144 | $SiO_2$ | 63.13 |
| 145 | $Nb_2O_5$ | 47.25 | 145 | $Nb_2O_5$ | 47.69 |
| 146 | $SiO_2$ | 100.88 | 146 | $SiO_2$ | 96.19 |
| 147 | $Nb_2O_5$ | 51.14 | 147 | $Nb_2O_5$ | 70.00 |
| 148 | $SiO_2$ | 130.39 | 148 | $SiO_2$ | 94.87 |
| 149 | $Nb_2O_5$ | 102.52 | 149 | $Nb_2O_5$ | 60.44 |
| 150 | $SiO_2$ | 127.82 | 150 | $SiO_2$ | 59.92 |
| 151 | $Nb_2O_5$ | 48.72 | 151 | $Nb_2O_5$ | 35.40 |
| 152 | $SiO_2$ | 127.17 | 152 | $SiO_2$ | 61.73 |
| 153 | $Nb_2O_5$ | 20.93 | 153 | $Nb_2O_5$ | 34.85 |
| 154 | $SiO_2$ | 92.76 | 154 | $SiO_2$ | 73.25 |
| 155 | $Nb_2O_5$ | 148.34 | 155 | $Nb_2O_5$ | 70.00 |
| 156 | $SiO_2$ | 67.86 | 156 | $SiO_2$ | 107.24 |
| 157 | $Nb_2O_5$ | 37.71 | 157 | $Nb_2O_5$ | 70.00 |
| 158 | $SiO_2$ | 111.57 | 158 | $SiO_2$ | 82.04 |
| 159 | $Nb_2O_5$ | 109.19 | 159 | $Nb_2O_5$ | 36.35 |
| 160 | $SiO_2$ | 52.37 | 160 | $SiO_2$ | 57.17 |
| | | | 161 | $Nb_2O_5$ | 51.47 |
| | | | 162 | $SiO_2$ | 54.70 |
| | | | 163 | $Nb_2O_5$ | 33.06 |
| | | | 164 | $SiO_2$ | 81.67 |
| | | | 165 | $Nb_2O_5$ | 70.00 |
| | | | 166 | $SiO_2$ | 115.39 |
| | | | 167 | $Nb_2O_5$ | 70.00 |
| | | | 168 | $SiO_2$ | 102.41 |
| | | | 169 | $Nb_2O_5$ | 33.60 |
| | | | 170 | $SiO_2$ | 63.66 |
| | | | 171 | $Nb_2O_5$ | 39.16 |
| | | | 172 | $SiO_2$ | 50.00 |
| | | | 173 | $Nb_2O_5$ | 51.25 |
| | | | 174 | $SiO_2$ | 77.14 |
| | | | 175 | $Nb_2O_5$ | 70.00 |
| | | | 176 | $SiO_2$ | 95.37 |
| | | | 177 | $Nb_2O_5$ | 60.98 |
| | | | 178 | $SiO_2$ | 75.26 |
| | | | 179 | $Nb_2O_5$ | 33.00 |
| | | | 180 | $SiO_2$ | 56.50 |
| | | | 181 | $Nb_2O_5$ | 40.33 |
| | | | 182 | $SiO_2$ | 59.43 |
| | | | 183 | $Nb_2O_5$ | 69.82 |
| | | | 184 | $SiO_2$ | 98.24 |
| | | | 185 | $Nb_2O_5$ | 70.00 |
| | | | 186 | $SiO_2$ | 95.65 |
| | | | 187 | $Nb_2O_5$ | 37.10 |
| | | | 188 | $SiO_2$ | 73.94 |
| | | | 189 | $Nb_2O_5$ | 33.00 |
| | | | 190 | $SiO_2$ | 50.00 |
| | | | 191 | $Nb_2O_5$ | 54.19 |
| | | | 192 | $SiO_2$ | 78.65 |
| | | | 193 | $Nb_2O_5$ | 70.00 |
| | | | 194 | $SiO_2$ | 88.80 |
| | | | 195 | $Nb_2O_5$ | 69.63 |
| | | | 196 | $SiO_2$ | 74.30 |
| | | | 197 | $Nb_2O_5$ | 34.53 |
| | | | 198 | $SiO_2$ | 51.00 |
| | | | 199 | $Nb_2O_5$ | 35.60 |
| | | | 200 | $SiO_2$ | 83.26 |
| | | | 201 | $Nb_2O_5$ | 62.88 |
| | | | 202 | $SiO_2$ | 91.59 |
| | | | 203 | $Nb_2O_5$ | 70.00 |
| | | | 204 | $SiO_2$ | 84.48 |
| | | | 205 | $Nb_2O_5$ | 42.55 |
| | | | 206 | $SiO_2$ | 50.00 |
| | | | 207 | $Nb_2O_5$ | 33.00 |
| | | | 208 | $SiO_2$ | 71.57 |
| | | | 209 | $Nb_2O_5$ | 51.31 |
| | | | 210 | $SiO_2$ | 90.13 |
| | | | 211 | $Nb_2O_5$ | 87.33 |
| | | | 212 | $SiO_2$ | 84.39 |
| | | | 213 | $Nb_2O_5$ | 39.82 |
| | | | 214 | $SiO_2$ | 70.52 |
| | | | 215 | $Nb_2O_5$ | 28.32 |
| | | | 216 | $SiO_2$ | 72.83 |
| | | | 217 | $Nb_2O_5$ | 33.67 |
| | | | 218 | $SiO_2$ | 83.66 |
| | | | 219 | $Nb_2O_5$ | 66.89 |
| | | | 220 | $SiO_2$ | 107.17 |
| | | | 221 | $Nb_2O_5$ | 102.59 |
| | | | 222 | $SiO_2$ | 84.09 |
| | | | 223 | $Nb_2O_5$ | 34.23 |
| | | | 224 | $SiO_2$ | 144.46 |
| | | | 225 | $Nb_2O_5$ | 89.76 |
| | | | 226 | $SiO_2$ | 24.43 |

The filter associated with the spectra depicted in FIG. 13 and TABLE 1 was manufactured using ion-assisted ion-beam sputtering and optical monitoring (see U.S. Pat. No. 7,068,430 for a detailed description of the process, herein incorporated by reference).

Figure 14:
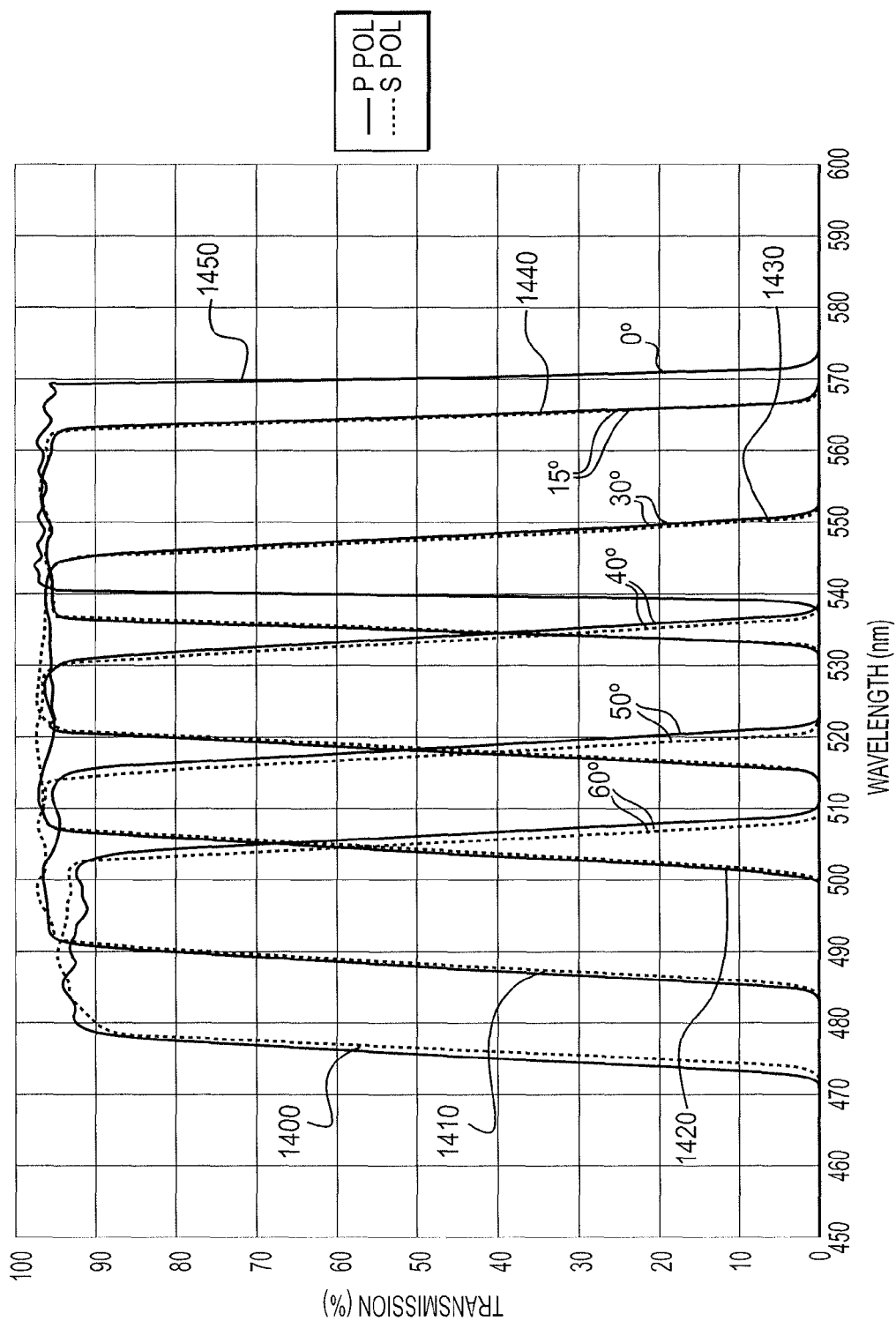
FIG. 14 depicts measured spectra at AOI's from 0 to 60 degrees associated with two tunable edge filters coated on opposite sides of a single substrate, consistent with an embodiment.
Figure 15:
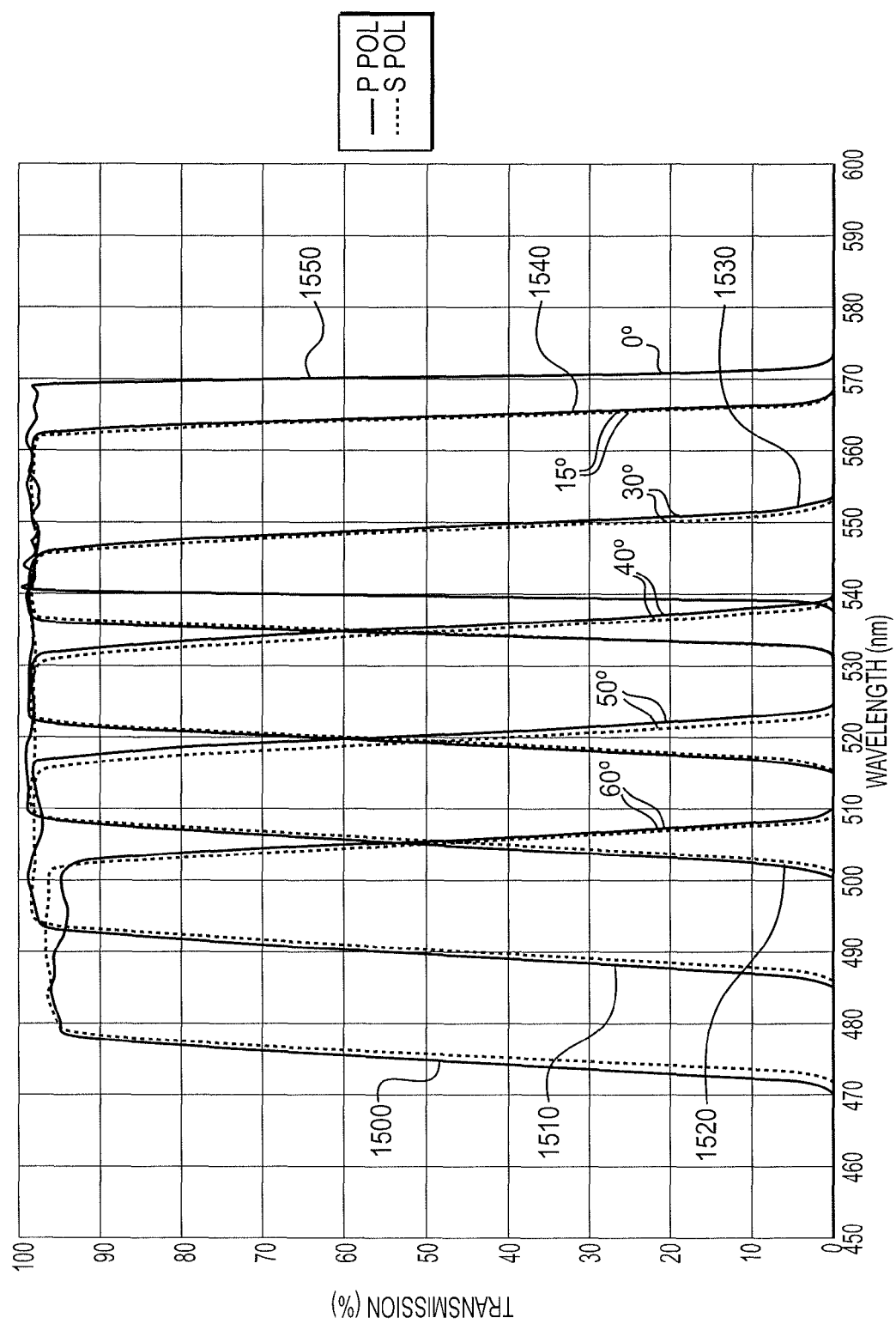
FIG. 15 depicts calculated spectra at AOI's from 0 to 60 degrees and 2.5° CHA for probe light associated with two tunable edge filters coated on opposite sides of a single substrate, consistent with an embodiment.

Consistent with an embodiment, transmission spectra of the resulting filter measured at a series of AOIs and for both orthogonal polarization states are shown in FIG. 14. Curves 1400 depict measured spectra at an AOI of 60 degrees, curves 1410 depict measured spectra at an AOI of 50 degrees, curves 1420 depict measured spectra at an AOI of 40 degrees, curves 1430 depict measured spectra at an AOI of 30 degrees, curves 1440 depict the measured spectra at an AOI of 15 degrees, and curves 1450 depict measured spectra at an AOI of 0 degrees. Consistent with an embodiment, the spectra were measured using a Perkin Elmer Lambda 950 commercial spectrophotometer with the resolution set to 0.1 nm. In the configuration used, the light beam at the filter is not perfectly collimated; the cone-half-angle (CHA) is about 2.5 degrees. This range of angles explains the apparent decreasing edge steepness as the AOI increases. The actual edge steepness for collimated light remains relatively constant, but when measuring the filter with probe light that covers a 5 degree range of angles, there is an averaging effect that occurs resulting in an apparently less steep edge (just as if the filter were measured with broad wavelength resolution setting on the spectrophotometer). To illustrate this effect, consistent with an embodiment, FIG. 15 shows calculated spectra for this filter design assuming probe light with a 2.5 degrees CHA. Curves 1500 depict calculated spectra at an AOI of 60 degrees, curves 1510 depict calculated spectra at an AOI of 50 degrees, curves 1520 depict calculated spectra at an AOI of 40 degrees, curves 1530 depict calculated spectra at an AOI of 30 degrees, curves 1540 depict calculated spectra at an AOI of 15 degrees, and curves 1550 depict calculated spectra at an AOI of 0 degrees, all assuming probe light with a 2.5 degrees CHA.

The sensitivity of the edge steepness that is apparent in the measured spectra and the calculated spectra for imperfectly collimated light, as shown in FIGS. 14 and 15 highlights a tradeoff to be considered for angle-tuned thin-film filters consistent with an embodiment. To maximize the tuning range of a filter for a given change in angle, or to maximize the speed with which a filter can be tuned, it is preferable to make the change in wavelength for a given change in angle as large as possible (equivalent to making $n_{eff}$ in tuning equation (1) as small as possible). The speed improves because inertia limits the speed with which a filter can be rotated by a given amount in a given time.

It is known that galvanometer scanners (i.e., "galvo-scanners") can operate more quickly over a smaller angular range; however, this increased sensitivity of wavelength to angle can come at a cost. The more sensitive the wavelength change is to a given change in angle, the more difficult it is to maintain sharp spectral features when using real light beams which are comprised of a range of angles. Laser-based systems typically have regions within the system in which the light is exceptionally well collimated (typically less than a few milliradians). However, even in the most highly collimated regions of many imaging systems, the range of light ray angles is often 1 to 2 degrees or more.

The sensitivity of wavelength to angle, characterized by the effective index $n_{eff}$, cannot be adjusted arbitrarily. $n_{eff}$ can be modified only very slightly by changing the design structure for filters consistent with the present disclosure. There is more flexibility to modify $n_{eff}$ for multi-cavity Fabry-Perot type filters, since the choice of spacer-layer material (whether it is high- or low-index material) can dramatically impact the value as the intensity of light is localized within these spacer layers. To appreciably change $n_{eff}$ for filters consistent with the present disclosure, different coating materials can be chosen. Care can be taken, however, not to decrease the index contrast (ratio of the difference between the high- and low-index values to the average value) too much, since a low contrast results in an excessive number of layers required to achieve steep edges and extended blocking.

Because of Snell's Law, which governs the refraction of light at an interface between media of two different indexes of refraction, the AOI of light within the actual thin-film coating layers is smaller than the AOI in air for filters. For example, consistent with an embodiment, when light is incident upon the tunable filter described above at an AOI in air of θ=60 degrees, inside the layers the angle is approximately $\theta_{eff}=\sin^{-1}(\sin \theta/n_{eff})$, or in this case $\theta_{eff}=28$ degrees, since the effective index is approximately $n_{eff}=1.84$. However, consistent with an embodiment, if the incident medium is a material other than air (such as glass), then the angle inside the layers would be larger, leading to a greater wavelength tuning sensitivity. For example, consistent with an embodiment where the tunable filter is embedded in a material other than air (an "embedded geometry"), such as glass, where the glass has an index of approximately n=1.5, then the angle inside the layers is approximately $\theta_{eff}=\sin^{-1}(n \sin \theta/n_{eff})$, or $\theta_{eff}=49$ degrees for an incident angle in glass of θ=60 degrees. Generally, when the incident medium has an index of n, the tuning dependence changes to $$\lambda(\theta) = \lambda(0)\sqrt{1 - \frac{n^2\sin^2(\theta)}{n_{eff}^2}} = \lambda(0)\sqrt{1 - \frac{\sin^2(\theta)}{(n_{eff}/n)^2}} \quad (11)$$

In other words, it is as if the effective index $n_{eff}$ has changed from $n_{eff}$ to $n_{eff}/n$. Thus, for the exemplary filter the new effective index is approximately 1.84/1.5=1.23. Consistent with an embodiment, accordingly, there can also be an increased wavelength tuning range for an embedded geometry. For example, if the AOI can be tuned from 0 to 60 degrees for an embedded geometry, equation (11) suggests that the wavelength would tune about 29% of the starting wavelength. For the exemplary filter above, tuning would go from 555 nm to 555 nm×0.71=394 nm. If the filter could be tuned from 0 to 70 degrees, the wavelength would tune about 35% of the starting wavelength. So a filter designed with a center wavelength of 650 nm at normal incidence could be tuned to below 420 nm. Such a filter would cover almost the entire visible range of wavelengths. However, generally it is not possible to tune the filter over such a large range of angles, for as the angle inside the coating layers becomes large, other physical effects occur that make it difficult to achieve a bandpass filter.

Thus, there is a larger change in wavelength for a given change in AOI for the case of the filter coating "embedded" in glass. An advantage of this increased sensitivity is that the filter coating area does not need to be as large for the embedded case for a given wavelength tuning range as it does for the case of the coating in air on a glass plate. Also, because the cost of thin-film coatings tends to be approximately proportional to coating area, there is a potential cost advantage for the embedded approach.

Figure 16:
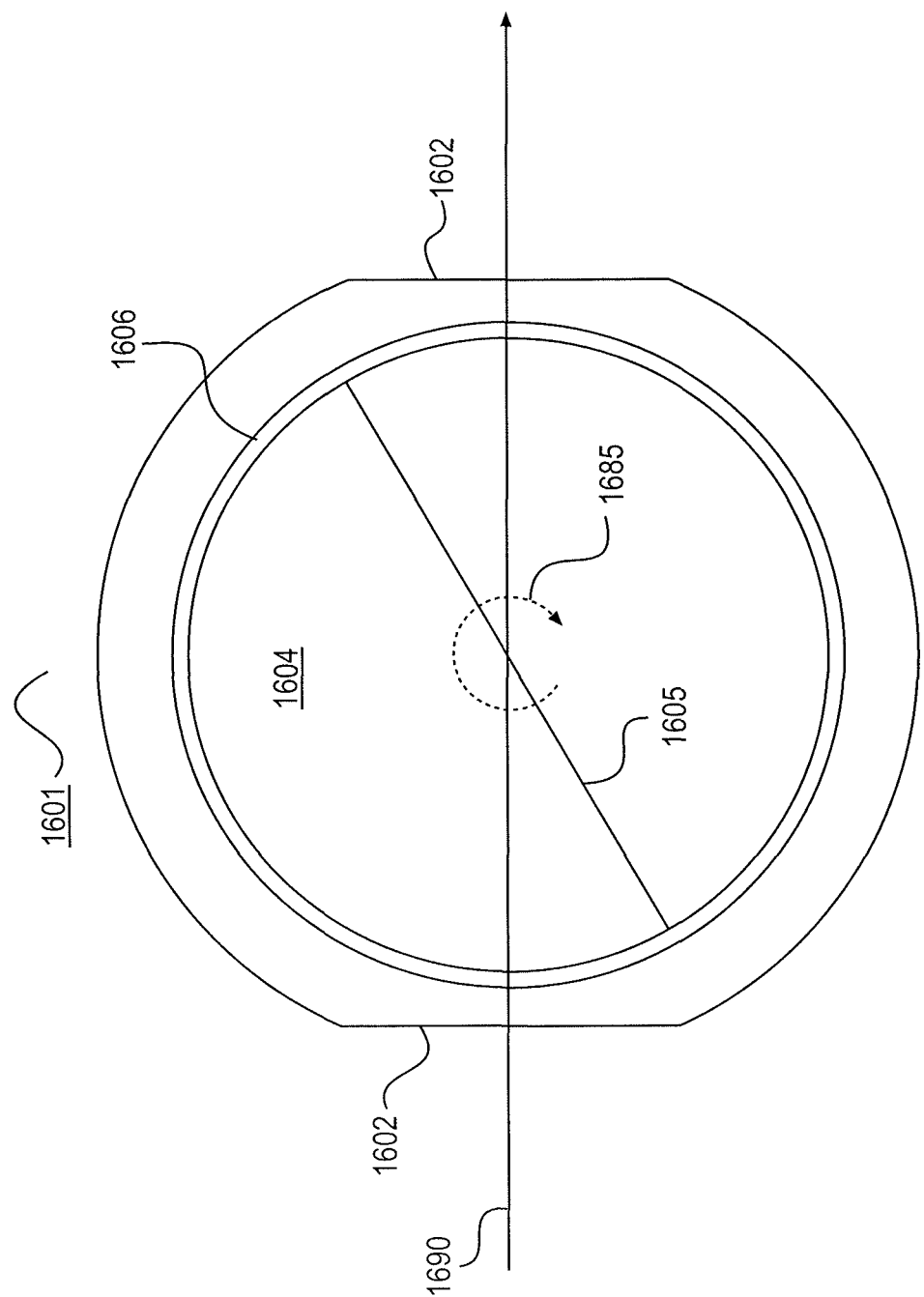
FIG. 16 depicts a filter where the medium for incident light on the coating layers is glass instead of air, consistent with an embodiment.

Consistent with an embodiment, FIG. 16 shows a possible approach to enabling incident light 1690 to travel through glass instead of air. As shown in FIG. 16, hollow glass cylinder 1601 (shown viewed from its end) has flat faces 1602 ground and polished as entrance and exit apertures. Glass cylinder 1604 with bandpass filter coating(s) 1605 applied to a flat plane bisecting glass cylinder 1604, with a diameter just slightly smaller than the hole in hollow glass cylinder 1601, can be made to freely rotate (1685) about its axis. This rotation could be accomplished by applying a very thin layer of index-matching oil in gap 1606. Gap 1606, for example, can exhibit a width of approximately 1 mm or smaller. Moreover, consistent with an embodiment, one or both of flat faces 1602 may be coated with AR coatings.

Figure 17:
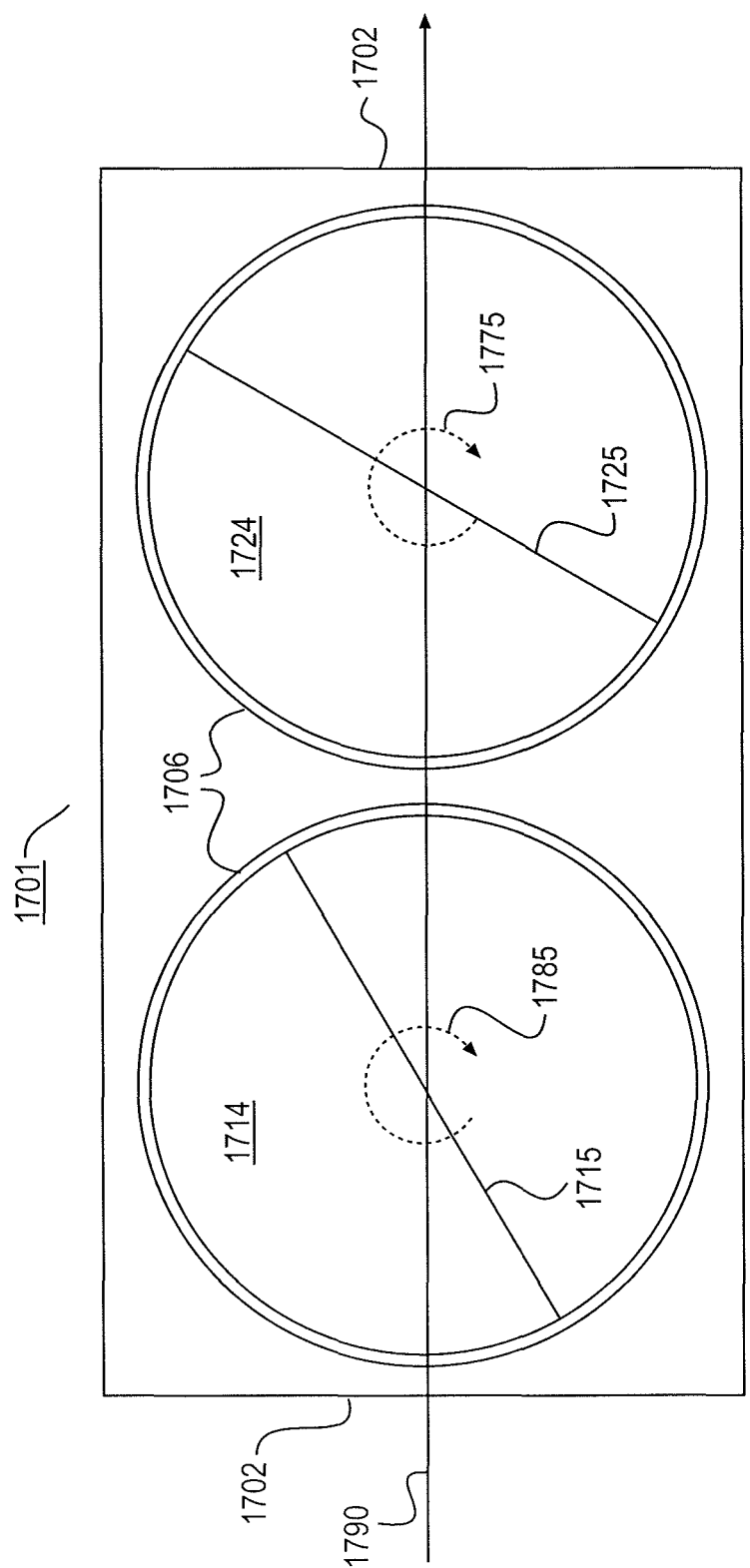
FIG. 17 depicts two tunable edge filters in series where the medium for incident light on the coating layers is glass instead of air, consistent with an embodiment.

Consistent with an embodiment, FIG. 17 depicts filter 1715 and filter 1725 applied to glass cylinder 1714 and glass cylinder 1724, respectively, where both cylinders 1714 and 1724 are inside two hollow cylindrical regions in rectangular glass block 1701. For example, filter 1715 and filter 1725 may be individual cut-on and cut-off edge filters. Small gap 1706 may be situated between each of glass cylinder 1714 and glass cylinder 1724 and rectangular glass block 1701. In addition, consistent with an embodiment, more than two filters may be concatenated in this way. Consistent with an embodiment, one or both flat surfaces 1702 may be coated with AR coatings.

Figure 18:
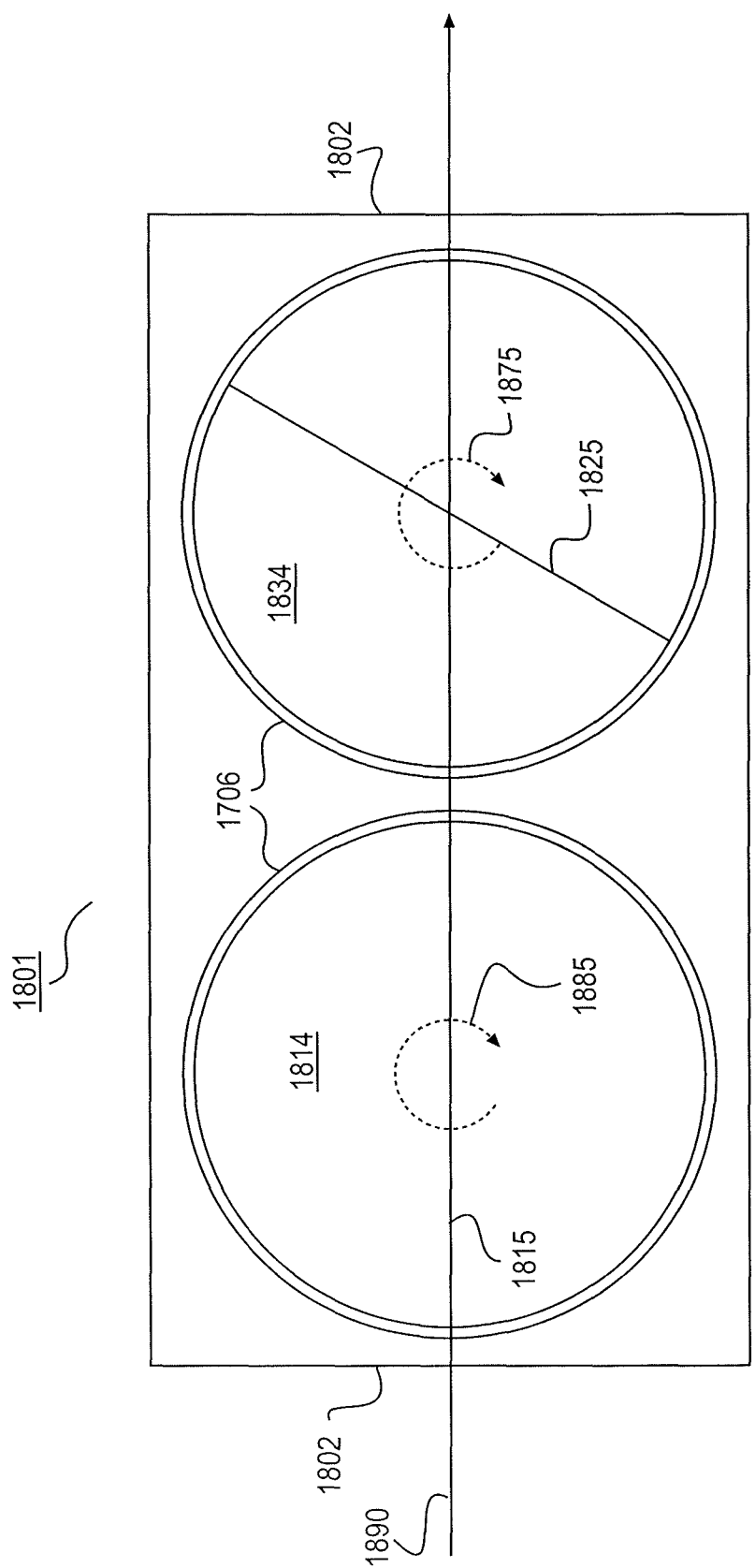
FIG. 18 depicts two tunable bandpass filters in series where the medium for incident light on the coating layers is glass instead of air, consistent with an embodiment.

Consistent with an embodiment, FIG. 18 depicts tunable filter 1815 and tunable filter 1825 in filter block 1801. For example, tunable filters 1815 and 1825 may be bandpass filters. Tunable filter 1815 and tunable filter 1825 can be applied to glass cylinder 1814 and glass cylinder 1834 respectively, which both can be positioned inside hollow cylindrical regions in rectangular glass block 1801. Small gap 1706 may again be situated between each of glass cylinder 1814 and glass cylinder 1834 and rectangular glass block 1801. Consistent with an embodiment, one or both flat surfaces 1802 can be coated with AR coatings.

Because the coating layer is thin, for many systems it is possible to rotate the angle of one of tunable filter 1815 and tunable filter 1825 so that the plane of the turned filter layer is parallel to the optical axis of the system, thus having minimal impact on the transmission of light 1890 through the system. In this case only the filter rotated to an angle substantially non-parallel to the optical axis would perform as a bandpass filter. In this way one could choose to use only one or the other bandpass filter at any given time, which would allow for covering a very broad tuning range with two or more filters, each of which covers one portion of the full tuning range.

Figure 19:
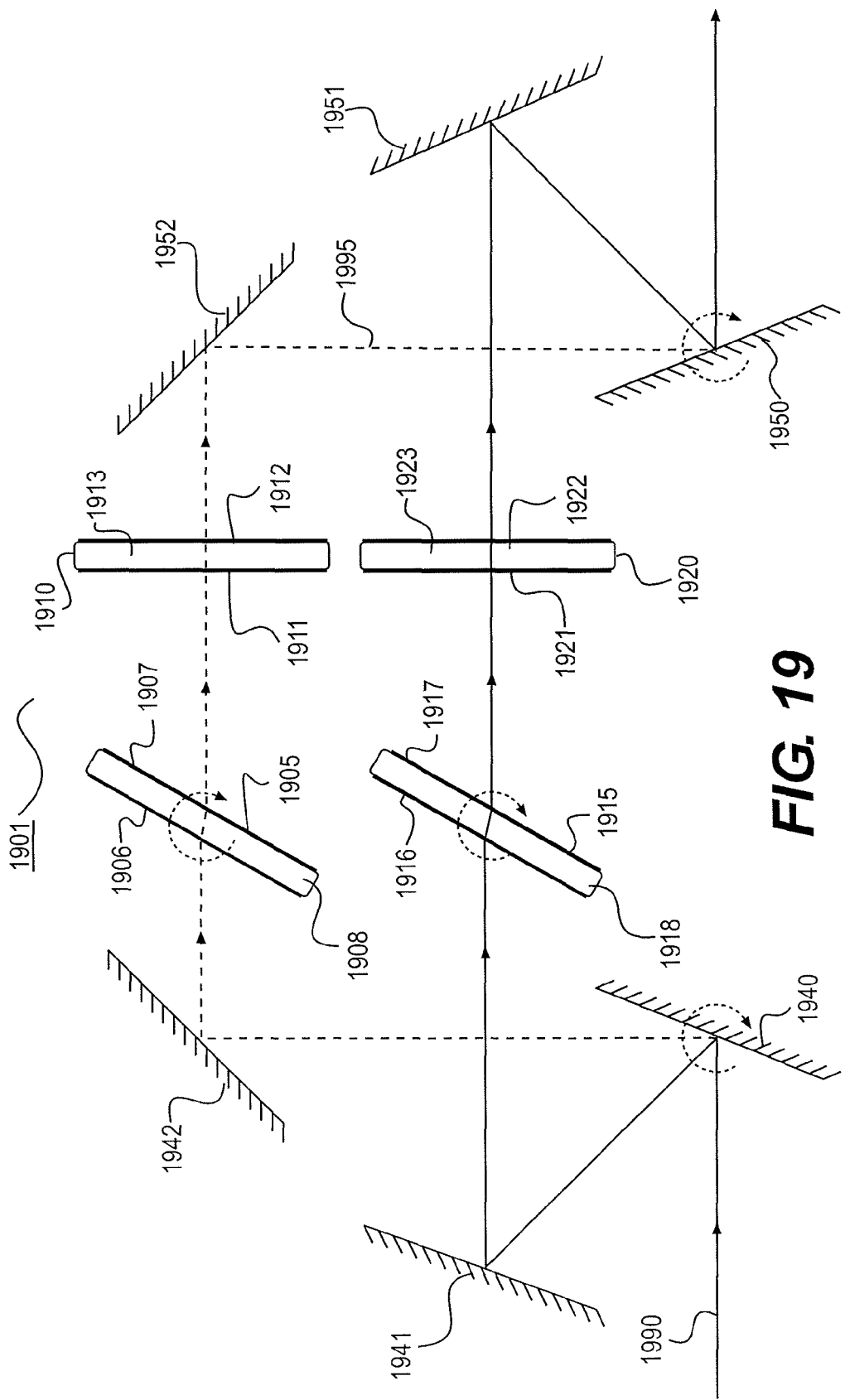
FIG. 19 depicts an optical system consistent with an embodiment, including tunable bandpass filters and an arrangement of mirrors used to redirect light into any one of two or more paths.

Because a tunable filter consistent with an embodiment does not have an arbitrarily wide tuning range, practical use for some applications may require methods to extend the effective tuning range using two or more filters. One way to accomplish such an extension is described above, as shown, for example in FIG. 18. Consistent with an embodiment, another way is to redirect light to a series of two or more filters or filter combinations. Consistent with an embodiment, an example is shown in FIG. 19, where rotatable flat mirror 1940 and rotatable flat mirror 1950 (for example driven directly by galvo-scanners) can be used to choose one of two or more optical paths defined by a first pair of fixed flat mirrors 1941 and 1951 or a second pair of fixed flat mirrors 1942 and 1952. Consistent with an embodiment, the mirrors can be arranged so that the optical path between rotatable flat mirror 1940 and rotatable flat mirrors 1950 is equal for all paths. The first optical path passes through tunable cut-on filter 1916, tunable cut-off filter 1917, extended blocking cut-on filter 1921, and extended blocking cut-off filter 1922. The second optical path passes through tunable cut-on filter 1906, tunable cut-off filter 1907, extended blocking cut-on filter 1911, and extended blocking cut-off filter 1912. Consistent with the disclosure, any of the embodiments discussed herein for the tunable filter can be inserted into any of the optical paths. For example, instead of the embodiment shown in FIG. 5, each path could contain a combination of two independently tunable edge filters as shown in FIGS. 7 and 17, thus allowing for arbitrary adjustment of the bandpass filter center wavelength and bandwidth within the tuning range associated with the path.

Systems and methods consistent with disclosure have widespread potential uses, in areas including: fluorescence microscopy and other fluorescence imaging and quantization applications, hyperspectral imaging, high-throughput spectroscopy, and telecommunications. For example, systems and methods consistent with disclosure may be used in an imaging system, in which a beam of light carrying image information passes through a filter, or it might be a non-imaging system simply collecting the maximum amount of light from a sample for detection. Systems and methods consistent with disclosure may require rapid tuning of the wavelength for capturing a continuous series of wavelength data points or images, or may take advantage of the wavelength tunability for optimal adjustment of the system performance.

In fluorescence microscopy and other fluorescence measurements, systems, methods, and filters consistent with the disclosure can be useful to control the spectra of the excitation light and the emission light. Systems, methods, and filters consistent with the disclosure can provide desirable instrumentation flexibility and even real-time optimization during changing experiments or conditions within a given experiment.

Hyperspectral imaging is used in applications ranging from remote sensing for monitoring of Earth resources to medical imaging, agricultural analysis, forensics, manufacturing, and more. This technique refers to the capture of a series of two-dimensional images, each at a different wavelength, thus resulting in an "image cube" of data in which each volume pixel (or "voxel") contains an intensity value associated with two spatial dimensions and a wavelength. Commonly hyperspectral imaging is implemented with a "pushbroom" image capture technique, in which a two-dimensional CCD array attached to a grating spectrometer captures individual frames with one-dimensional spatial information along one axis of the CCD and spectral information along the other. The system is then scanned along the other spatial axis (which occurs naturally as an airplane flies over the Earth, for example), so that each successive frame captures a new row of spatial information, but displaced in time. Systems, methods, and filters consistent with the disclosure can be used to transmit a two-dimensional imaging beam, thereby enabling the often more desirable capture mode in which each frame captures two dimensions of spatial information (which typically benefit from higher resolution requiring more pixels), with the lower-resolution spectral measurements displaced in time.

Systems, methods, and filters consistent with the disclosure may also provide simple, compact spectral measurement systems, especially when throughput is more important than spectral resolution. And systems, methods, and filters consistent with the disclosure may also be elements in fiber-optic telecommunications systems, both for test and measurement purposes and because they may considerably simplify the complexity of wavelength discrimination components in installed systems by creating "wavelength agility."

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. An optical filter comprising:
at least one substrate;
a first plurality of alternating first and second material layers, and a second plurality of alternating first and second material layers, each of said first and second material layers in said first and second pluralities having respectively different refractive indices wherein:
said first plurality of alternating first and second material layers is configured to exhibit a first surface with a first normal vector at a first angle to a first direction of electromagnetic radiation incident on said first plurality and to exhibit a tunable cut-on edge at a first wavelength as a function of said first angle;
said second plurality of alternating first and second material layers is configured to exhibit a second surface with a second normal vector at a second angle to a second direction of said electromagnetic radiation incident on said second plurality and to exhibit a tunable cut-off edge at a second wavelength as a function of said second angle;
said first plurality of alternating first and second material layers exhibits a first polarization splitting at said first wavelength and a first s-stopband edge at a first s-stopband wavelength, all as a function of said first angle, for said electromagnetic radiation incident on said first plurality;
said second plurality of alternating first and second material layers exhibits a second polarization splitting at said second wavelength and a second s-stopband edge at a second s-stopband wavelength, all as a function of said second angle, for said electromagnetic radiation incident on said second plurality;
said first polarization splitting does not exceed approximately 1 percent of said first wavelength as a function of said first angle for any first angle with a value between approximately 0 degrees and approximately 40 degrees;
said second polarization splitting does not exceed approximately 1 percent of said second wavelength as a function of said second angle for any second angle with a value between approximately 0 degrees and approximately 40 degrees; and the value of said first angle and the value of said second angle are such that said second s-stopband wavelength is approximately ≦ said first wavelength, which is less than said second wavelength, which is approximately ≦ said first s-stopband wavelength.

2. The optical filter of claim 1 wherein:
the substrate has a first substrate surface and a second substrate surface; and
the first plurality of alternating first and second material is deposited on said first substrate surface, and the second plurality of alternating first and second material layers is deposited on said second substrate surface.

3. The optical filter of claim 2 further comprising:
a galvo-scanner configured to rotate said at least one substrate.

4. The optical filter of claim 1 wherein:
the substrate has a first substrate surface and a second substrate surface; and
the first plurality of alternating first and second material layers and the second plurality of alternating first and second material layers are deposited on said substrate according to a configuration selected from one of: a first configuration wherein said first plurality of alternating first and second material layers are deposited on said second plurality of alternating first and second material layers, which are deposited on said first substrate surface and a second configuration wherein said second plurality of alternating first and second material layers are deposited on said first plurality of alternating first and second material layers, which are deposited on said first substrate surface.

5. The optical filter of claim 4 further comprising:
a galvo-scanner configured to rotate said at least one substrate.

6. The optical filter of claim 4 further comprising:
an antireflective coating deposited on said second substrate surface.

7. The optical filter of claim 1 further comprising:
an extended blocking filter.

8. The optical filter of claim 4 further comprising:
an extended blocking filter.

9. The optical filter of claim 1 further comprising:
a second substrate; wherein:
the first plurality of alternating first and second material is deposited on said at least one substrate, and the second plurality of alternating first and second material layers is deposited on said second substrate.

10. The optical filter of claim 9 further comprising:
a first galvo-scanner configured to rotate said at least one substrate; and
a second galvo-scanner configured to rotate said second substrate.

11. The optical filter of claim 9:
wherein said at least one substrate is configured to rotate about a first axis parallel to said first surface, and the second substrate is configured to rotate about a second axis parallel to said second surface.

12. The optical filter of claim 11:
wherein rotation of the at least one substrate is configured to introduce a first lateral shift on said electromagnetic radiation incident on said at least one substrate, and where rotation of the second substrate is configured to introduce a second lateral shift on said electromagnetic radiation incident on said second substrate.

13. The optical filter of claim 12:
wherein said first lateral shift and said second lateral shift are approximately equal and in opposite directions.

14. The optical filter of claim 1 wherein:
said first polarization splitting further does not exceed approximately 1 percent of said first wavelength as a function of said first angle for any first angle with a value between approximately 40 degrees and approximately 60 degrees.

15. The optical filter of claim 1 wherein:
said second polarization splitting further does not exceed approximately 1 percent of said second wavelength as a function of said second angle for any second angle with a value between approximately 40 degrees and approximately 60 degrees.

16. The optical filter of claim 14 wherein:
said second polarization splitting does not further exceed approximately 1 percent of said second wavelength as a function of said second angle for any second angle with a value between approximately 40 degrees and approximately 60 degrees.

17. A method of making an optical filter, the steps comprising:
depositing a first plurality of alternating first and second material layers on a first substrate surface;
depositing a second plurality of alternating first and second material layers on a second substrate surface;
wherein each of said first and second material layers in said first and second pluralities have respectively different refractive indices;
wherein said first plurality of alternating first and second material layers deposited on said first substrate surface is configured to exhibit a first surface with a first normal vector at a first angle to a first direction of electromagnetic radiation incident on said first plurality and to exhibit a tunable cut-on edge at a first wavelength as a function of said first angle;
wherein said second plurality of alternating first and second material layers deposited on said second substrate surface is configured to exhibit a second surface with a second normal vector at a second angle to a second direction of said electromagnetic radiation incident on said second plurality and to exhibit a tunable cut-off edge at a second wavelength as a function of said second angle;
wherein said first plurality of alternating first and second material layers deposited on said first substrate surface is configured to exhibit a first polarization splitting at said first wavelength and a first s-stopband edge at a first s-stopband wavelength, all as a function of said first angle, for said electromagnetic radiation incident on said first plurality;
wherein said second plurality of alternating first and second material layers deposited on said second substrate surface is configured to exhibit a second polarization splitting at said second wavelength and a second s-stopband edge at a second s-stopband wavelength, all as a function of said second angle, for said electromagnetic radiation incident on said second plurality; and
wherein said first polarization splitting does not exceed approximately 1 percent of said first wavelength as a function of said first angle for any first angle with a value between approximately 0 degrees and approximately 40 degrees;
wherein said second polarization splitting does not exceed approximately 1 percent of said second wavelength as a function of said second angle for any second angle with a value between approximately 0 degrees and approximately 40 degrees;

wherein the value of said first angle and the value of said second angle are such that said second s-stopband wavelength is approximately≦said first wavelength, which is less than said second wavelength, which is approximately≦said first s-stopband wavelength; and wherein the separation between the first wavelength determined by said value of said first angle and the second wavelength determined by said value of said second angle is a passband region such that electromagnetic radiation in said passband region is at least approximately 80% transmitted.

18. The method of making an optical filter of claim 17, further comprising:

introducing at least one substrate with a first side and a second side;

wherein said at least one substrate exhibits said first substrate surface on said first side and exhibits said second substrate surface on said second side.

19. The method of making an optical filter of claim 17 further comprising:

introducing at least one substrate with a first side and a second side;

where said at least one substrate exhibits said first substrate surface on said first side; and wherein the first plurality of alternating first and second material layers is deposited on said first substrate surface and the second plurality of alternating first and second material layers are deposited on said second substrate surface according to a configuration selected from one of: a first configuration wherein said first substrate surface is said second plurality of alternating first and second material layers and said second substrate surface is said first side, and a second configuration wherein said first substrate surface is said first side and said second substrate surface is said first plurality of alternating first and second material layers.

20. The method of making an optical filter of claim 19 further comprising:

depositing an antireflective coating on said second side.

21. The method of making an optical filter of claim 17 further comprising:

introducing an extended blocking filter.

22. The method of making an optical filter of claim 19 further comprising:

introducing an extended blocking filter.

23. The method of making an optical filter of claim 17 further comprising:

introducing at least one substrate with a first side; and
introducing a second substrate with a second side; where:
said first substrate surface is said first side and said second substrate surface is said second side.

24. The method of making an optical filter of claim 23:

wherein said at least one substrate is configured to rotate about a first axis parallel to said first surface, and the second substrate is configured to rotate about an axis parallel to said second surface.

25. The method of making an optical filter of claim 24:

wherein rotation of the at least one substrate is configured to introduce a first lateral shift on said electromagnetic radiation incident on said at least one substrate, and where rotation of the second substrate is configured to introduce a second lateral shift on said electromagnetic radiation incident on said second substrate.

26. The method of making an optical filter of claim 25:

wherein said first lateral shift and said second lateral shift are approximately equal and in opposite directions.

27. The method of making an optical filter of claim 17 wherein:

said first polarization splitting further does not exceed approximately 1 percent of said first wavelength as a function of said first angle for any first angle with a value between approximately 40 degrees and approximately 60 degrees.

28. The method of making an optical filter of claim 17 wherein:

said second polarization splitting further does not exceed approximately 1 percent of said second wavelength as a function of said second angle for any second angle with a value between approximately 40 degrees and approximately 60 degrees.

29. The method of making an optical filter of claim 27 wherein:

said second polarization splitting does not further exceed approximately 1 percent of said second wavelength as a function of said second angle for any second angle with a value between approximately 40 degrees and approximately 60 degrees.

30. An optical filter comprising:

at least one substrate;

a first plurality of alternating first and second material layers, and a second plurality of alternating first and second material layers, each of said first and second material layers in said first and second pluralities having respectively different refractive indices wherein:

said first plurality of alternating first and second material layers is configured to exhibit a first surface with a first normal vector at a first angle to a first direction of electromagnetic radiation incident on said first plurality and to exhibit a tunable cut-on edge at a first wavelength as a function of said first angle;

said second plurality of alternating first and second material layers is configured to exhibit a second surface with a second normal vector at a second angle to a second direction of said electromagnetic radiation incident on said second plurality and to exhibit a tunable cut-off edge at a second wavelength as a function of said second angle;

said first plurality of alternating first and second material layers exhibits a first polarization splitting at said first wavelength and a first s-stopband edge at a first s-stopband wavelength, all as a function of said first angle, for said electromagnetic radiation incident on said first plurality;

said second plurality of alternating first and second material layers exhibits a second polarization splitting at said second wavelength and a second s-stopband edge at a second s-stopband wavelength, all as a function of said second angle, for said electromagnetic radiation incident on said second plurality;

a first value of said first angle and a first value of said second angle are such that said second s-stopband wavelength is approximately≦said first wavelength, which is less than said second wavelength, which is approximately≦said first s-stopband wavelength, where the separation between the first wavelength determined by said first value of said first angle and the second wavelength determined by said first value of said second angle is a first passband region such that electromagnetic radiation in said first passband region is at least approximately 80% transmitted and the difference between said first wavelength determined by said first value of said first angle and said second wavelength determined by said first value of said second angle is a first passband width;
a second value of said first angle and a second value of said second angle are such that said second s-stopband wavelength is approximately≦said first wavelength, which is less than said second wavelength, which is approximately≦said first s-stopband wavelength, where the separation between the first wavelength determined by said second value of said first angle and the second wavelength determined by said second value of said second angle is a second passband region such that electromagnetic radiation in said second passband region is at least approximately 80% transmitted and the difference between said first wavelength determined by said second value of said first angle and said second wavelength determined by said second value of said second angle is a second passband width;
said first polarization splitting does not exceed approximately 1 percent of said first wavelength as a function of said first angle for any first angle with a value between said first value of said first angle and said second value of said first angle;
said second polarization splitting does not exceed approximately 1 percent of said second wavelength as a function of said second angle for any second angle with a value between said first value of said second angle and said second value of said second angle; and
said first wavelength determined by said second value of said first angle is approximately at least within six percent of said first wavelength determined by said first value of said first angle and said second wavelength determined by said second value of said second angle is approximately at least within six percent of said second wavelength determined by said first value of said second angle.

31. The optical filter of claim 30 wherein:
said first passband width is approximately equal to said second passband width.

32. The optical filter of claim 30 wherein:
the substrate has a first substrate surface and a second substrate surface; and
the first plurality of alternating first and second material is deposited on said first substrate surface, and the second plurality of alternating first and second material layers is deposited on said second substrate surface.

33. The optical filter of claim 30 wherein:
the substrate has a first substrate surface and a second substrate surface; and
the first plurality of alternating first and second material layers and the second plurality of alternating first and second material layers are deposited on said substrate according to a configuration selected from one of: a first configuration wherein said first plurality of alternating first and second material layers are deposited on said second plurality of alternating first and second material layers, which are deposited on said first substrate surface and a second configuration wherein said second plurality of alternating first and second material layers are deposited on said first plurality of alternating first and second material layers, which are deposited on said first substrate surface.

34. The optical filter of claim 33 further comprising:
an antireflective coating deposited on said second substrate surface.

35. The optical filter of claim 30 further comprising:
an extended blocking filter.

36. The optical filter of claim 33 further comprising:
an extended blocking filter.

37. The optical filter of claim 30 further comprising:
a second substrate; where:
the first plurality of alternating first and second material is deposited on said at least one substrate, and the second plurality of alternating first and second material layers is deposited on said second substrate.

38. The optical filter of claim 37:
wherein said at least one substrate is configured to rotate about a first axis parallel to said first surface, and the second substrate is configured to rotate about an axis parallel to said second surface.

39. The optical filter of claim 38:
wherein rotation of the at least one substrate is configured to introduce a first lateral shift on said electromagnetic radiation incident on said at least one substrate, and where rotation of the second substrate is configured to introduce a second lateral shift on said electromagnetic radiation incident on said second substrate.

40. The optical filter of claim 39:
wherein said first lateral shift and said second lateral shift are approximately equal and in opposite directions.

41. The optical filter of claim 30 wherein:
said first wavelength determined by said second value of said first angle is approximately at least within twelve percent of said first wavelength determined by said first value of said first angle and said second wavelength determined by said second value of said second angle is approximately at least within twelve percent of said second wavelength determined by said first value of said second angle.

42. The optical filter of claim 30 further comprising:
an incident medium with an index of refraction greater than that of air;
wherein said first plurality of alternating first and second material and said second plurality of alternating first and second material layers are embedded in said incident medium.

43. The optical filter of claim 42:
wherein said incident medium comprises a first embedding material, a second embedding material, and index-matching oil;
wherein said first embedding material is configured with a first incident surface, a second incident surface, and a substantially cylindrical cavity containing said index-matching oil; and
wherein said second embedding material is substantially cylindrical and configured to be rotatably disposed within said substantially cylindrical cavity containing said index-matching oil of said first embedding material; and
wherein said first embedding material, said second embedding material, and said index-matching oil all exhibit a substantially equivalent index of refraction; and
wherein said first plurality of alternating first and second material layers and said second plurality of alternating first and second material layers are configured to be embedded within said second embedding material.

44. The optical filter of claim 43:
wherein said first incident surface and said second incident surface are substantially parallel and are configured to exhibit a third normal vector at a third angle to said first direction of electromagnetic radiation, where said third angle is substantially zero.

45. The optical filter of claim 44 further comprising:
a first antireflective coating deposited on said first incident surface and a second antireflective coating deposited said second incident surface.

46. The optical filter of claim 45 wherein:
the first embedding material and the second embedding material comprise glass.

47. The optical filter of claim 46 further comprising:
at least one galvo-scanner configured to rotate said second embedding material.

48. The optical filter of claim 46 wherein:
said first plurality of alternating first and second material layers and said second plurality of alternating first and second material layers are configured to be deposited substantially across a diameter of said second embedding material.

49. The optical filter of claim 42:
wherein said incident medium comprises a first embedding material, a second embedding material, a third embedding material, and index-matching oil;
wherein said first embedding material is configured with a first incident surface, a second incident surface, a first substantially cylindrical cavity containing said index-matching oil, and a second substantially cylindrical cavity containing said index-matching oil; and
wherein said second embedding material is substantially cylindrical and configured to be rotatably disposed within said first substantially cylindrical cavity containing said index-matching oil of said first embedding material;
wherein said third embedding material is substantially cylindrical and configured to be rotatably disposed within said second substantially cylindrical cavity containing said index-matching oil of said first embedding material; and
wherein said first embedding material, said second embedding material, said third embedding material, and index-matching oil all exhibit a substantially equivalent index of refraction; and
wherein said first plurality of alternating first and second material layers is configured to be embedded within said second embedding material and said second plurality of alternating first and second material layers is configured to be embedded within said third embedding material.

50. The optical filter of claim 38 further comprising:
an incident medium with an index of refraction greater than that of air;
wherein said first plurality of alternating first and second material and said second plurality of alternating first and second material layers are embedded in said incident medium.

51. The optical filter of claim 50:
wherein said incident medium comprises a first embedding material, a second embedding material, a third embedding material, and index-matching oil;
wherein said first embedding material is configured with a first incident surface, a second incident surface, a first substantially cylindrical cavity containing said index-matching oil, and a second substantially cylindrical cavity containing said index-matching oil; and
wherein said second embedding material is substantially cylindrical and configured to be rotatably disposed within said first substantially cylindrical cavity containing said index-matching oil of said first embedding material;
wherein said third embedding material is substantially cylindrical and configured to be rotatably disposed within said second substantially cylindrical cavity containing said index-matching oil of said first embedding material; and
wherein said first embedding material, said second embedding material, said third embedding material, and said index-matching oil all exhibit a substantially equivalent index of refraction; and
wherein said first plurality of alternating first and second material layers is configured to be embedded within said second embedding material and said second plurality of alternating first and second material layers is configured to be embedded within said third embedding material.

52. An optical system, comprising:
a first optical filter according to claim 30; and
a second optical filter according to claim 30;
wherein the second passband width of the first optical filter is configured to overlap with the first passband width of the second optical filter such that the first wavelength determined by the second value of the first angle of the first optical filter is approximately the same as the second wavelength determined by the first value of the second angle of the second optical filter.

53. An optical system, comprising:
a first optical filter according to claim 32; and
a second optical filter according to claim 32;
wherein the second passband width of the first optical filter is configured to overlap with the first passband width of the second optical filter such that the first wavelength determined by the second value of the first angle of the first optical filter is approximately the same as the second wavelength determined by the first value of the second angle of the second optical filter.

54. An optical filter, comprising:
at least one substrate;
a first plurality of alternating first and second material layers, and a second plurality of alternating first and second material layers, each of said first and second material layers in said first and second pluralities having respectively different refractive indices wherein:
said first plurality of alternating first and second material layers is configured to exhibit a first surface with a first normal vector at a first angle to a first direction of electromagnetic radiation incident on said first plurality and to exhibit a tunable cut-on edge at a first wavelength as a function of said first angle;
said second plurality of alternating first and second material layers is configured to exhibit a second surface with a second normal vector at a second angle to a second direction of said electromagnetic radiation incident on said second plurality and to exhibit a tunable cut-off edge at a second wavelength as a function of said second angle;
said first plurality of alternating first and second material layers exhibits a first polarization splitting at said first wavelength and a first s-stopband edge at a first s-stopband wavelength, all as a function of said first angle, for said electromagnetic radiation incident on said first plurality;
said second plurality of alternating first and second material layers exhibits a second polarization splitting at said second wavelength and a second s-stopband edge at a second s-stopband wavelength, all as a function of said second angle, for said electromagnetic radiation incident on said second plurality; and
said first polarization splitting does not exceed approximately 1 percent of said first wavelength as a function of said first angle for any first angle with a value between approximately 0 degrees and approximately 40 degrees;

said second polarization splitting does not exceed approximately 1 percent of said second wavelength as a function of said second angle for any second angle with a value between approximately 0 degrees and approximately 40 degrees;

the value of said first angle and the value of said second angle are such that said second s-stopband wavelength is approximately ≦said first wavelength, which is less than said second wavelength, which is approximately ≦said first s-stopband wavelength; and the separation between the first wavelength determined by said value of said first angle and the second wavelength determined by said value of said second angle is a passband region such that electromagnetic radiation in said passband region is at least approximately 80% transmitted.

55. A method of making an optical filter, the steps comprising:

depositing a first plurality of alternating first and second material layers on a first substrate surface;

depositing a second plurality of alternating first and second material layers on a second substrate surface;

wherein each of said first and second material layers in said first and second pluralities have respectively different refractive indices;

wherein said first plurality of alternating first and second material layers deposited on said first substrate surface is configured to exhibit a first surface with a first normal vector at a first angle to a first direction of electromagnetic radiation incident on said first plurality and to exhibit a tunable cut-on edge at a first wavelength as a function of said first angle;

wherein said second plurality of alternating first and second material layers deposited on said second substrate surface is configured to exhibit a second surface with a second normal vector at a second angle to a second direction of said electromagnetic radiation incident on said second plurality and to exhibit a tunable cut-off edge at a second wavelength as a function of said second angle;

wherein said first plurality of alternating first and second material layers deposited on said first substrate surface is configured to exhibit a first polarization splitting at said first wavelength and a first s-stopband edge at a first s-stopband wavelength, all as a function of said first angle, for said electromagnetic radiation incident on said first plurality;

wherein said second plurality of alternating first and second material layers deposited on said second substrate surface is configured to exhibit a second polarization splitting at said second wavelength and a second s-stopband edge at a second s-stopband wavelength, all as a function of said second angle, for said electromagnetic radiation incident on said second plurality; and wherein said first polarization splitting does not exceed approximately 1 percent of said first wavelength as a function of said first angle for any first angle with a value between approximately 0 degrees and approximately 40 degrees;

wherein said second polarization splitting does not exceed approximately 1 percent of said second wavelength as a function of said second angle for any second angle with a value between approximately 0 degrees and approximately 40 degrees;

wherein the value of said first angle and the value of said second angle are such that said second s-stopband wavelength is approximately ≦said first wavelength, which is less than said second wavelength, which is approximately ≦said first s-stopband wavelength; and wherein the separation between the first wavelength determined by said value of said first angle and the second wavelength determined by said value of said second angle is a passband region such that electromagnetic radiation in said passband region is at least approximately 80% transmitted.

* * * * *